United States Patent
Banerjee et al.

(10) Patent No.: US 10,359,833 B2
(45) Date of Patent: Jul. 23, 2019

(54) ACTIVE-CORE-BASED PERFORMANCE BOOST

(71) Applicant: QUALCOMM Incorporated, San Diego, CA (US)

(72) Inventors: Sarbartha Banerjee, Bangalore (IN); Pawan Chhabra, Bangalore (IN); Navid Toosizadeh, San Diego, CA (US); Sreekanth Nallagatla, Bangalore (IN); Shih-Hsin Jason Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/187,426

(22) Filed: Jun. 20, 2016

(65) Prior Publication Data
US 2017/0364140 A1 Dec. 21, 2017

(51) Int. Cl.
*G06F 1/3206* (2019.01)
*G06F 1/3296* (2019.01)
(Continued)

(52) U.S. Cl.
CPC .............. *G06F 1/3296* (2013.01); *G06F 1/08* (2013.01); *G06F 1/324* (2013.01); *G06F 1/3206* (2013.01); *G06F 1/3228* (2013.01)

(58) Field of Classification Search
CPC ...... G06F 1/324; G06F 1/3203; G06F 1/3296; G06F 1/3243; G06F 1/206; G06F 1/3206;
(Continued)

(56) References Cited

U.S. PATENT DOCUMENTS 7,155,621 B2 12/2006 Dai
7,502,948 B2 3/2009 Rotem et al.
(Continued)

OTHER PUBLICATIONS

International Search Report and Written Opinion—PCT/US2017/029663—ISA/EPO—dated Aug. 4, 2017.

*Primary Examiner* — Jaweed A Abbaszadeh
*Assistant Examiner* — Brian J Corcoran
(74) *Attorney, Agent, or Firm* — Haynes and Boone, LLP

(57) ABSTRACT

A hardware system is disclosed for active-core-based performance boost. In an example aspect, the hardware system includes multiple cores and a power mode manager. Each core can be powered up if active or powered down if inactive. The power mode manager manages a power mode collection including an independent power mode collection and an active-core-dependent power mode collection. The power mode manager includes a software-accessible power mode manager and a hardware-reserved power mode manager. The software-accessible power mode manager provides a power-mode-triggering pathway to enable software to trigger activation of an independent power mode of the independent power mode collection. The hardware-reserved power mode manager excludes the software from being able to trigger activation of a dependent power mode of the active-core-dependent power mode collection and triggers activation of a dependent power mode of the active-core-dependent collection based on a number of active cores of the multiple cores.

30 Claims, 10 Drawing Sheets

(51) Int. Cl.
*G06F 1/08* (2006.01)
*G06F 1/3228* (2019.01)
*G06F 1/324* (2019.01)

(58) Field of Classification Search
CPC .. G06F 1/3287; G06F 9/30083; G06F 1/3293; G06F 9/5094; Y02B 60/1217; Y02B 60/1285; Y02B 60/32; Y02B 60/1275; Y02B 60/1282; Y02B 60/121
See application file for complete search history.

(56) References Cited

U.S. PATENT DOCUMENTS

| | | | |
|---|---|---|---|
| 8,245,070 B2 | 8/2012 | Finkelstein et al. | |
| 8,650,424 B2 | 2/2014 | Rotem et al. | |
| 8,793,512 B2 | 7/2014 | Branover et al. | |
| 8,904,205 B2 * | 12/2014 | Burns | G06F 1/26 713/300 |
| 9,037,889 B2 | 5/2015 | Ananthakrishnan et al. | |
| 9,141,426 B2 * | 9/2015 | Bhandaru | G06F 11/3409 |
| 2004/0071184 A1 * | 4/2004 | Naveh | G06F 1/3203 374/42 |
| 2006/0004538 A1 * | 1/2006 | Cancel | G06F 1/206 702/136 |
| 2006/0026447 A1 * | 2/2006 | Naveh | G06F 1/3203 713/322 |
| 2006/0149975 A1 * | 7/2006 | Rotem | G06F 1/206 713/300 |
| 2007/0156370 A1 * | 7/2007 | White | G06F 1/206 702/132 |
| 2008/0005592 A1 * | 1/2008 | Allarey | G06F 1/206 713/300 |
| 2008/0040622 A1 * | 2/2008 | Duran | G06F 1/3203 713/300 |
| 2008/0244294 A1 * | 10/2008 | Allarey | G06F 1/3203 713/320 |
| 2009/0132844 A1 * | 5/2009 | Allarey | G06F 1/206 713/340 |
| 2009/0235108 A1 * | 9/2009 | Gold | G06F 1/206 713/500 |
| 2011/0154069 A1 * | 6/2011 | Costales | G06F 1/3203 713/300 |
| 2012/0066535 A1 * | 3/2012 | Naffziger | G06F 1/206 713/340 |
| 2012/0072746 A1 | 3/2012 | Sotomayor | |
| 2012/0079290 A1 * | 3/2012 | Kumar | G06F 1/26 713/300 |
| 2012/0179938 A1 * | 7/2012 | Nijhawan | G06F 1/3206 714/47.2 |
| 2013/0047011 A1 * | 2/2013 | Dice | G06F 9/485 713/320 |
| 2013/0061064 A1 * | 3/2013 | Ananthakrishnan | G06F 1/26 713/300 |
| 2014/0068284 A1 * | 3/2014 | Bhandaru | G06F 1/26 713/300 |
| 2014/0181537 A1 | 6/2014 | Manne et al. | |
| 2014/0337646 A1 * | 11/2014 | Varma | G06F 1/3206 713/322 |
| 2014/0380071 A1 | 12/2014 | Lee et al. | |
| 2015/0234450 A1 * | 8/2015 | Lin | G06F 1/3293 713/323 |
| 2015/0286266 A1 | 10/2015 | Shrall et al. | |
| 2016/0179156 A1 * | 6/2016 | Eastep | G06F 1/324 713/300 |
| 2017/0220099 A1 * | 8/2017 | Ramachandran | G06F 1/3287 |

* cited by examiner ated and the corresponding performance level provided by a processor. If the performance level provided by the processor is insufficient to meet the demands of the current workload, the software issues a request to the underlying hardware to increase the voltage and frequency levels. On the other hand, if the current workload demands are easily met by the processor's performance level, the software can request a decrease to the voltage level and the frequency level to reduce power consumption by the electronic device.

ACTIVE-CORE-BASED PERFORMANCE BOOST

TECHNICAL FIELD

This disclosure relates generally to power management with electronic devices and, more specifically, to managing power usage by processors in electronic devices.

BACKGROUND

Modern electronic devices come in many fauns. Personal modern electronic devices include smart watches, mobile phones, and notebook computers. Modern electronic devices deployed by corporations include server machines that power large data centers and cloud computing services, and computing technology that is embedded in other devices, such as vehicles and manufacturing equipment. Each of these kinds of electronic devices play an important role in modern life. For example, electronic devices provide navigational directions, control manufacturing robots, stream movies and news, and provide access to both web pages and emails.

What each of these electronic devices have in common is some kind of processor, as well as some level of power consumption. Processors operate as the brains of electronic devices by implementing functionality that has been encoded into a program that can be executed by a processor. This program execution consumes power. Accordingly, efforts have been made to reduce the power consumed by electronic devices when executing programs. When power consumption is reduced, money is saved and the earth's resources are conserved. Furthermore, battery-powered electronic devices last longer between charges and can be made smaller as battery sizes are reduced.

To execute a program and thereby provide some functionality, a processor uses a supply voltage to power the performance of computing operations. These operations are performed at a rate that is dependent on a frequency of a clock signal. Generally, the higher the supply voltage and the higher the clock signal, the faster the processor can perform operations and perform functions. However, the higher the supply voltage and the higher the clock signal, the more power the processor consumes.

One approach to reducing power consumption is to lower a voltage level of a supply voltage or a frequency level of a clock signal. This is referred to as dynamic voltage and frequency scaling (DVFS). Software, such as that of an operating system (OS), requests that a voltage level or a frequency level be adjusted based on a current workload, which can be an application that is being executed by the operating system. With conventional DVFS, the software monitors an intensity of a computational workload as well as the corresponding performance level provided by a processor. If the performance level provided by the processor is insufficient to meet the demands of the current workload, the software issues a request to the underlying hardware to increase the voltage and frequency levels. On the other hand, if the current workload demands are easily met by the processor's performance level, the software can request a decrease to the voltage level and the frequency level to reduce power consumption by the electronic device.

Unfortunately, employing conventional DVFS is a complicated undertaking. Consequently, conventional DVFS implementations are resource intensive and cannot respond to operating state changes in a timely manner.

SUMMARY

In an example aspect, a hardware system is disclosed. The hardware system includes multiple cores and a power mode manager. Each core of the multiple cores is configured to be powered up if active or powered down if inactive. The power mode manager is configured to manage a power mode collection including an independent power mode collection and an active-core-dependent power mode collection. The power mode manager includes a software-accessible power mode manager and a hardware-reserved power mode manager. The software-accessible power mode manager is configured to provide a power-mode-triggering pathway to enable software to trigger activation of an independent power mode of the independent power mode collection. The hardware-reserved power mode manager is configured to exclude the software from being able to trigger activation of a dependent power mode of the active-core-dependent power mode collection. The hardware-reserved power mode manager is further configured to trigger activation of a dependent power mode of the active-core-dependent collection based on a number of active cores of the multiple cores.

In an example aspect, a hardware system is disclosed. The hardware system includes multiple cores and a power mode manager. Each core of the multiple cores is configured to be powered up if active or powered down if inactive. The power mode manager includes an independent power mode collection and an active-core-dependent power mode collection. The independent power mode collection includes multiple independent power modes that are configured to be activated independently of a number of currently-active cores of the multiple cores. The active-core-dependent power mode collection includes at least one dependent power mode that is configured to be activated conditioned on the number of currently-active cores of the multiple cores. The power mode manager also includes means for providing a power-mode-triggering pathway to enable software to trigger activation of an independent power mode of the independent power mode collection. The power mode manager further includes means for enabling hardware to trigger activation of the dependent power mode of the active-core-dependent collection based on the number of currently-active cores of the multiple cores.

In an example aspect, a method by an integrated circuit to implement an active-core-based performance boost is disclosed. The method includes receiving an instruction from software to change a power state of the integrated circuit to an independent power mode. Responsive to receipt of the instruction from the software, the independent power mode of the integrated circuit is activated. The method also includes, in an absence of an instruction from the software to change the power state of the integrated circuit, conditionally activating a dependent power mode to enter a boosted power state of the integrated circuit. The conditional activation of the dependent power mode includes ascertaining a number of active cores of the integrated circuit and comparing the number of active cores to an active core threshold number. If the number of active cores comports with the active core threshold number, the dependent power mode is activated to cause the integrated circuit to enter the boosted power state.

In an example aspect, an integrated circuit is disclosed. The integrated circuit includes multiple cores and a power mode manager. Each core of the multiple cores is configured to be awake if active or asleep if inactive. The integrated circuit also includes a software-accessible power mode collection and a hardware-reserved power mode collection. The software-accessible power mode collection includes multiple independent power modes that are configured to be exposed for activation by software executing on the integrated circuit. The hardware-reserved power mode collection includes at least one dependent power mode that is configured to be withheld from activation by the software. The power mode manager is configured to ascertain a number of active cores of the multiple cores and perform a comparison including the number of active cores and an active core threshold number. The power mode manager is also configured to activate the dependent power mode to cause a boosted voltage or a boosted frequency to be provided to at least one active core of the multiple cores based on the comparison.

DETAILED DESCRIPTION

Figure 1:
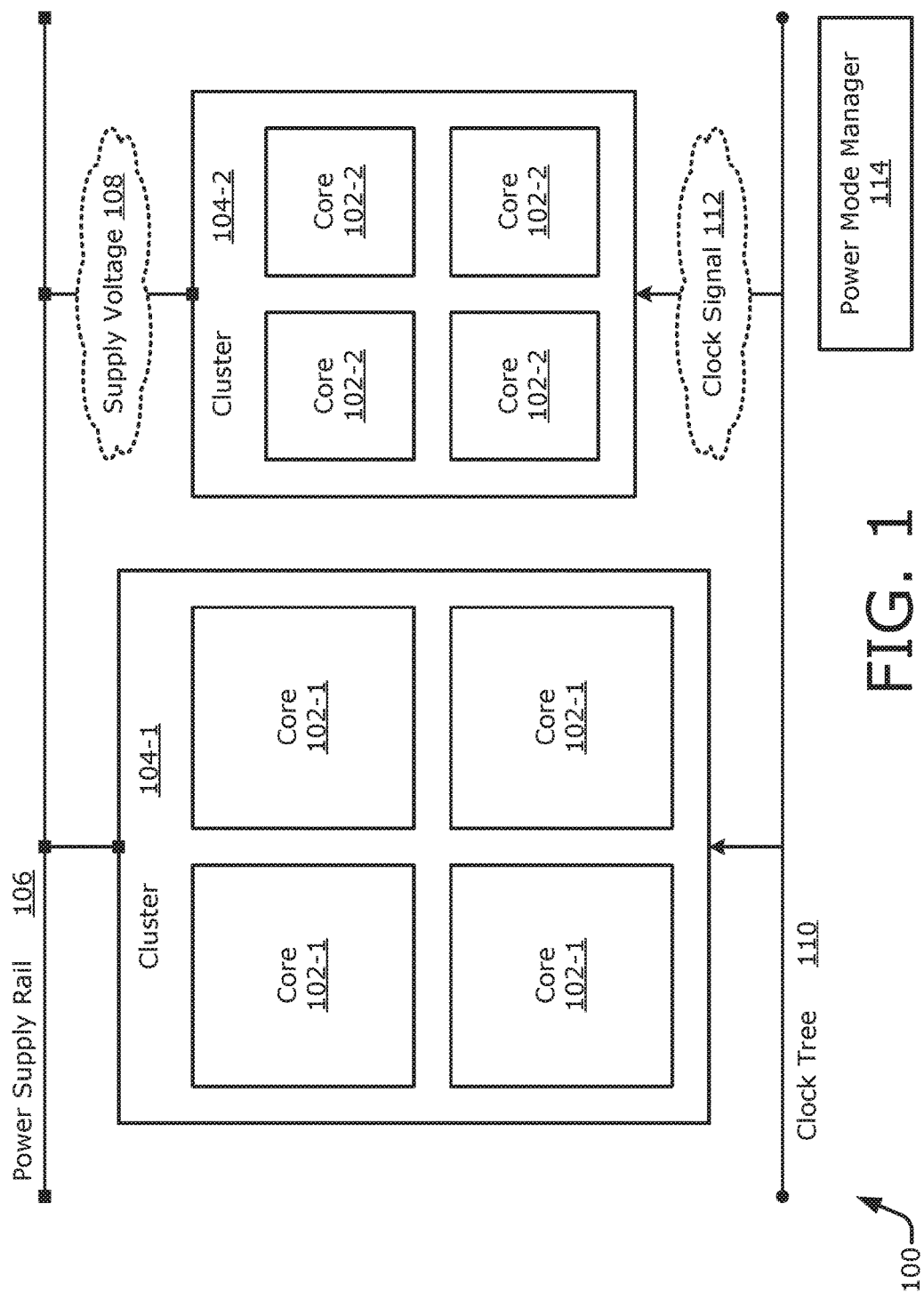
FIG. 1 illustrates a portion of a multi-core integrated circuit including a power mode manager in accordance with example embodiments.

Conventional dynamic voltage and frequency scaling (DVFS) is a complicated undertaking. Software, such as an operating system (OS), analyzes the current execution workload and provides instructions to the underlying hardware for when and how to change voltage and frequency levels on a dynamic basis. An advantage of software-based DVFS is that the operating system is aware of the processing needs of the application being executed. The operating system can therefore tune the voltage and frequency scaling for a given processor based on the code that is actually being executed by the processor. A disadvantage of software-based DVFS is that the scaling is relatively slow. The software takes time to monitor the application, as well as any physical parameters such as temperature. Furthermore, time elapses while the software instructs the hardware to make voltage and frequency changes. Consequently, using software-based DVFS is not feasible in high performance situations that demand scaling responsiveness.

In comparison to software-based DVFS, hardware-based DVFS does not have an effective window into the processing needs of an executing application. It is therefore difficult for hardware-based DVFS to tune voltage and frequency changes to meet the needs of the code being executed. On the other hand, hardware can implement DVFS significantly faster. For example, hardware can implement DVFS as much as three orders of magnitude, or a 1000 times, faster than software.

In contrast with a software-based or a hardware-based DVFS approach, example embodiments described herein employ a hybrid DVFS approach. Power management capabilities are shared between software and hardware. Generally, a power management environment includes multiple power modes, with each power mode corresponding to a voltage and frequency pair (which is termed a "voltage-frequency corner" herein). The responsibility for triggering a new power mode, which changes a current voltage-frequency corner, is shared between software and hardware.

In some example implementations, a power mode collection is bifurcated along a first dimension into two types of power modes: software-accessible power modes and hardware-reserved power modes. The operating system is empowered to trigger activation of the software-accessible power modes. The underlying hardware, such as circuitry of an integrated circuit, provides a pathway for the software to trigger activation of one of the software-accessible power modes. However, the integrated circuit excludes from the software the ability to trigger activation of any of the hardware-reserved power modes.

In other example implementations, a power mode collection is bifurcated along a second dimension into two kinds of power modes: independent power modes and dependent power modes. The independent power modes can be freely triggered independently of how many processor cores are currently active. Triggering a dependent power mode, on the other hand, is conditioned or dependent on a number of currently-active cores. For example, a particular dependent power mode may be capable of being triggered if two cores are active, but not if three or more cores are active.

Typically, a highest permissible voltage-frequency corner is determined so as to meet current or temperature constraints of an integrated circuit chip or an overall electronic device. To ensure that current and temperature constraints are met, the highest available voltage-frequency corner is determined assuming that all cores are active. Although this cautious approach ensures safe operation of the chip, this approach can also leave some current or temperature headroom unused whenever fewer than all of the cores of the chip are active.

Consequently, implementing an active-core-dependent power collection can provide benefits. For a given number of active cores that is fewer than all of the cores of an integrated circuit chip, the voltage and frequency can exceed the highest voltage and frequency permitted if all cores are active. In other words, more processing performance can be extracted from an integrated circuit chip by increasing the voltage and frequency without having to activate another core. This is advantageous because activating a core is slower than increasing the voltage and frequency. Moreover, once a core is activated, power consumption increases even if the core is not being fully utilized because of leakage current.

Unfortunately, realizing an active-core-dependent power collection with an integrated circuit can also create problems, at least if the realization is not implemented carefully. The voltage-frequency corner of a dependent power mode of the active-core-dependent power mode collection exceeds the highest voltage-frequency corner of the independent power modes. And the voltage-frequency corner of the dependent power mode is active if fewer than all of the cores are active. As a result, there can be times when a core should be powered up to accommodate an increasing workload while the dependent power mode is currently active. Because the dependent power mode has a boosted voltage and a boosted frequency that exceed a safe operational level if all cores are active, the voltage level or the frequency level provided to the processing cores is reduced prior to bringing another core online. This situation can stall processing throughput, at least for the core being activated. Because software-implemented power management is so much slower than a power mode manager that is implemented in hardware, the stall time causes too great an impact on processor performance if an active-core-dependent power mode collection is realized with software.

To address these conflicting factors and motivations, a power mode collection is bifurcated into two groups along both the first dimension and the second dimension. More specifically, the independent power mode collection is aligned with the software-accessible power modes, and the active-core-dependent power mode collection is aligned with the hardware-reserved power modes. Thus, software is granted access to trigger the independent power modes that can be activated regardless of a number of active cores. In contrast, the dependent power modes that are capable of being activated in dependence on a number of currently-active cores are reserved for being triggered by hardware.

In this manner, the greater intelligence provided by software can be utilized to trigger the independent power modes. Knowledge of processing workload or code tendencies that can be garnered by the operating system can be applied to determine if an independent power mode should be triggered or a core should be activated to service unmet processing demands. Further, the greater speed of hardware can be utilized to manage a dependent power mode. For instance, hardware reserves the capability to trigger the dependent power mode. Hardware can operate at a rate that is sufficient to boost a voltage-frequency corner if a number of active cores so permits, but still scale the voltage or frequency back quickly to reduce a stall time to an acceptable level if another core is to be activated.

Example embodiments for an integrated circuit include a power mode manager that offers a software-accessible power mode collection and a hardware-reserved power mode collection. The software-accessible power mode collection includes independent power modes that can be triggered regardless of how many cores of the integrated circuit are active. The integrated circuit provides a pathway for software to trigger the independent power modes. The hardware-reserved power mode collection includes at least one dependent power mode that is conditionally triggered in dependence on a number of active cores of the integrated circuit. However, the integrated circuit excludes the software from being able to trigger the dependent power modes.

In response to an indication that performance demands are not being met, the hardware of an integrated circuit chip can trigger activation of a dependent power mode of the hardware-reserved power mode collection. Triggering the dependent power mode is conditional on a number of cores of the integrated circuit that are currently active. In an example operation, a power mode manager that is realized as hard-coded circuitry of the chip obtains a current number of active cores of the integrated circuit. The power mode manager compares the current number of active cores to a threshold number of active cores. If the current number of active cores comports with the threshold number of active cores, the power mode manager triggers activation of the dependent power mode. The triggering causes the integrated circuit to enter a boosted power state for the dependent power mode. Upon activation, a boosted voltage and a boosted frequency corresponding to the dependent power mode are applied to the active cores of the integrated circuit.

The integrated circuit can also implement multiple active core thresholds corresponding to multiple different dependent power modes. Thus, if three of four cores are active, a first dependent power mode is available for activation that corresponds to a first voltage-frequency corner. If just two of four cores are active, in addition to the first dependent power mode, a second dependent power mode corresponding to a second voltage-frequency corner is available. In this scenario, the voltage and frequency of the second voltage-frequency corner can be higher than those of the first voltage-frequency corner because fewer cores are active.

FIG. 1 illustrates a portion of a multi-core integrated circuit 100 including a power mode manager 114 in accordance with example embodiments. Multiple cores 102 of the integrated circuit 100 are separated into two clusters 104. Specifically, the cores 102 are separated into a first cluster 104-1 and a second cluster 104-2. Each cluster 104 includes four cores 102. Two cores 102 may have at least similar circuitry and provide similar functionality or may be different in terms of circuitry or functionality. The integrated circuit 100 also includes a power supply rail 106 and a clock tree 110. The integrated circuit 100 can form at least a portion of a hardware system. A hardware system can further include another integrated circuit, a metallic interconnection between integrated circuits, a printed circuit board (PCB), other components of an electronic device, and so forth.

The cluster and core arrangement of the integrated circuit 100 is organized into a big-little configuration. With a big-little configuration, one cluster is larger than the other cluster. Further, the cores of the one cluster are larger than those of the other cluster. The larger cluster can typically provide higher performance, but the larger cluster uses more power. Inversely, the smaller cluster uses less power, but the smaller cluster can only provide a lower level of performance. As illustrated in the integrated circuit 100, the first cluster 104-1 and the cores 102-1 thereof correspond to the big portion of the big-little configuration. The second cluster 104-2 and the cores 102-2 thereof correspond to the little portion of the big-little configuration.

The power supply rail 106 distributes a supply voltage 108 around the integrated circuit 100. Thus, the first cluster 104-1 and the second cluster 104-2 are coupled to the power supply rail 106 and are powered by the supply voltage 108. The clock tree 110 distributes a clock signal 112 around the integrated circuit 100. The first cluster 104-1 and the second cluster 104-2 are coupled to the clock tree 110 and operate at a rate in accordance with the clock signal 112.

The power mode manager 114 is capable of managing the power consumed by the integrated circuit 100 by switching power modes to change a voltage level of the supply voltage 108 or a frequency level of the clock signal 112. Power mode examples are described with reference to FIG. 2. The power mode manager 114 is also capable of controlling how many cores 102 or clusters 104 are currently active. A core 102 or a cluster 104 can be activated or deactivated based on processor demands. Each core 102 of the multiple cores 102 is powered down if the core is inactive or can be powered up if the core is active.

In the example illustrated in FIG. 1, two clusters 104, four cores 102 per cluster 104, and eight total cores 102 are shown. However, the principles that are described herein are applicable to other configurations. For example, the multiple cores of an integrated circuit may be separated into more than two clusters or may not be separated into any clusters. The number of cores per cluster may differ from four and may be different in different clusters. Further, power management techniques may be applied to the cores within a single cluster or to at least a portion of those distributed across multiple clusters. Additionally, cores or clusters may be of different sizes from each other (e.g., like the big-little configuration or within a single cluster) or may have the same size.

Figure 2:
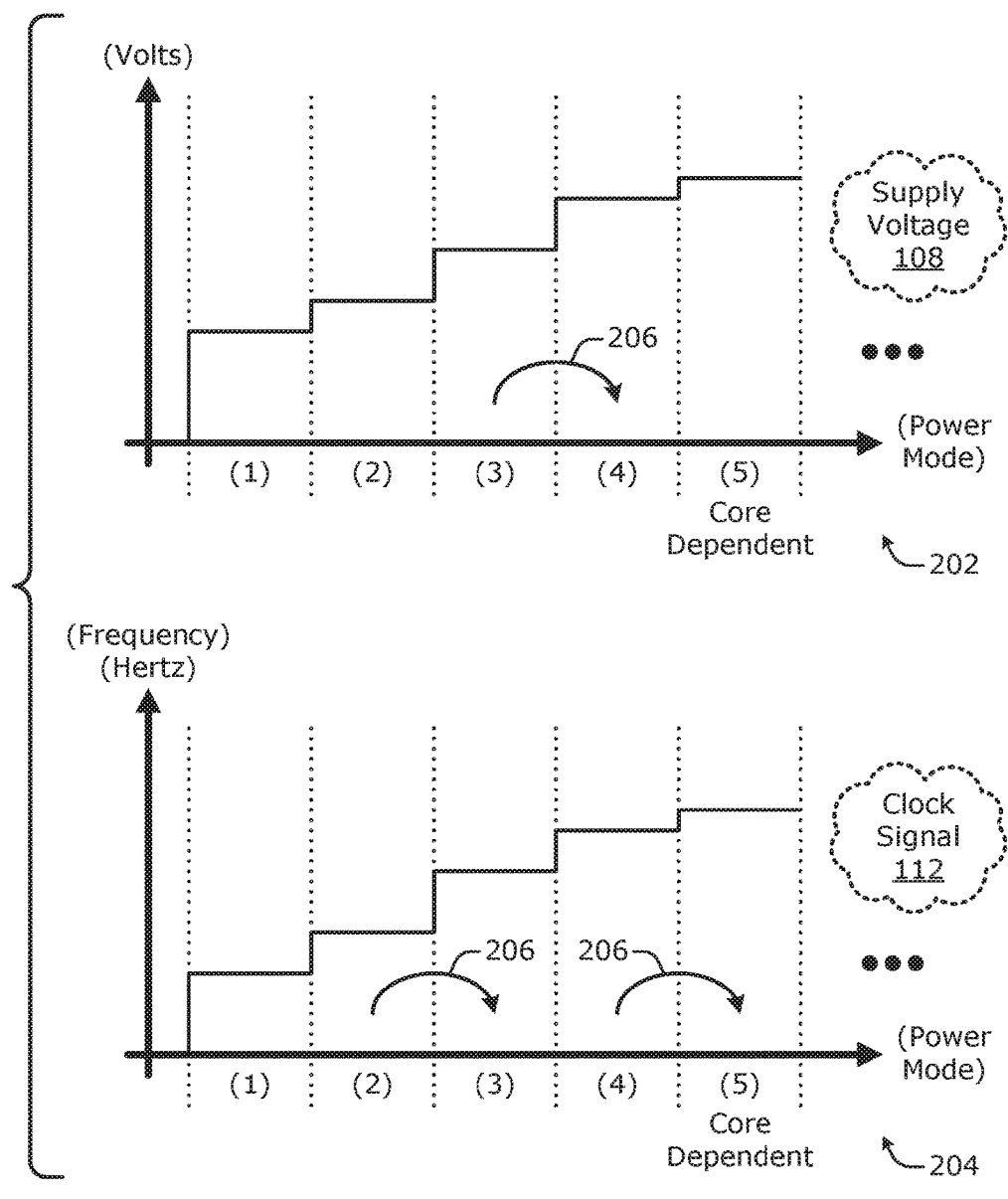
FIG. 2 illustrates example voltage and frequency pairs of corresponding power modes across two graphs.

FIG. 2 illustrates generally at 200 voltage and frequency pairs of corresponding example power modes across two graphs. An upper graph 202 depicts power modes versus volts. A lower graph 204 depicts power modes versus hertz. Across the abscissa axis of both graphs are five different power modes (1)-(5). The ordinate axis of the upper graph 202 indicates various voltage levels of the supply voltage 108 for the different power modes. The ordinate axis for the bottom graph 204 indicates various frequency levels of the clock signal 112 for the different power modes.

The voltage of the first power mode (1) in the upper graph 202 and the frequency of the first power mode (1) in the lower graph 204 form a voltage and frequency pair, or voltage-frequency corner, for the first power mode (1). The voltage of the second power mode (2) in the upper graph 202 and the frequency of the second power mode (2) in the lower graph 204 form a voltage and frequency pair for the second power mode (2). The corresponding voltage and frequency pairs are also depicted for the third, fourth, and fifth power modes (3), (4), and (5). The fifth power mode (5) is indicated as being core dependent, or being implemented in dependence on a number of currently-active cores. The fourth power mode (4) is therefore a highest non-dependent, or independent, power mode. Independent and dependent power modes are described with reference to FIG. 3.

The voltage and frequency both increase as the power modes move from left to right. Hence, the voltage and frequency increase as an integrated circuit 100 transitions from the first power mode (1) to the second power mode (2) or from the third power mode (3) to the fourth power mode (4). Consequently, the power consumption, as well as the processing performance, of the integrated circuit 100 increases as the power modes transition from left to right. To switch between power modes or transition to a new power mode, an entity triggers the initiation of a power mode change as indicated by the arrows 206. Software and hardware examples of such an entity are described with reference to FIG. 4. A triggering of a power mode causes the voltage-frequency corner corresponding to the triggered power mode to be applied to circuitry of the integrated circuit 100, such as the cores 102.

Table 1 below shows an example collection of power modes:

TABLE 1

Examples of names, voltages, and frequencies of five power modes (1)-(5).

| Power Mode | Voltage (V) | Frequency (GHz) |
|---|---|---|
| (5) Boost | 0.95 | 1.9 |
| (4) Turbo | 0.90 | 1.7 |
| (3) High | 0.75 | 1.4 |
| (2) Medium | 0.60 | 1.2 |
| (1) Low | 0.50 | 0.8 |

The names include low, medium, high, turbo, and boost. The voltage range is 0.50 to 0.95 volts. The frequencies range from 0.8 to 1.9 GHz. The voltage level (0.90 V) and the frequency level (1.7 GHz) of the fourth power mode (4), which is labeled turbo above, represent a highest voltage level and a highest frequency level, respectively, of the non-boost power modes. The fifth power mode (5) is labeled a boost power mode in Table 1. A voltage and a frequency of a boost or dependent power mode may also be referred to herein as a "boosted voltage" or a "boosted frequency," respectively. In example implementations, the voltage and frequency both increase and decrease in steps. However, voltage or frequency levels may alternatively be changed using a smaller granularity, with different granularities or steps, or in a continuous fashion. Also, although both the voltage and the frequency increase monotonically in the graphs of FIG. 2, the voltage or the frequency may remain constant or decrease as the power modes move rightward across the graphs. Further, although five power modes (1)-(5) are shown, more or fewer power modes may alternatively be implemented.

In example embodiments, the voltage level and the frequency level of the boost power mode are determined for a given design of an integrated circuit chip in dependence on a number of currently-active cores. This simplifies a DVFS mechanism because triggering activation of the boost power mode is independent of a current workload of a processor. Moreover, the voltage and frequency levels of the boost power mode are deterministic for a given integrated circuit design. These levels are predetermined to work regardless of a current operational temperature or a contemporaneous current draw across a range of temperatures and currents specified for the integrated circuit. Thus, a DVFS mechanism can be further simplified because a boost power mode is triggered by hardware of the integrated circuit in dependence on a number of currently-active cores and independently of both a current operational temperature and a contemporaneous current draw of the chip.

Figure 3:
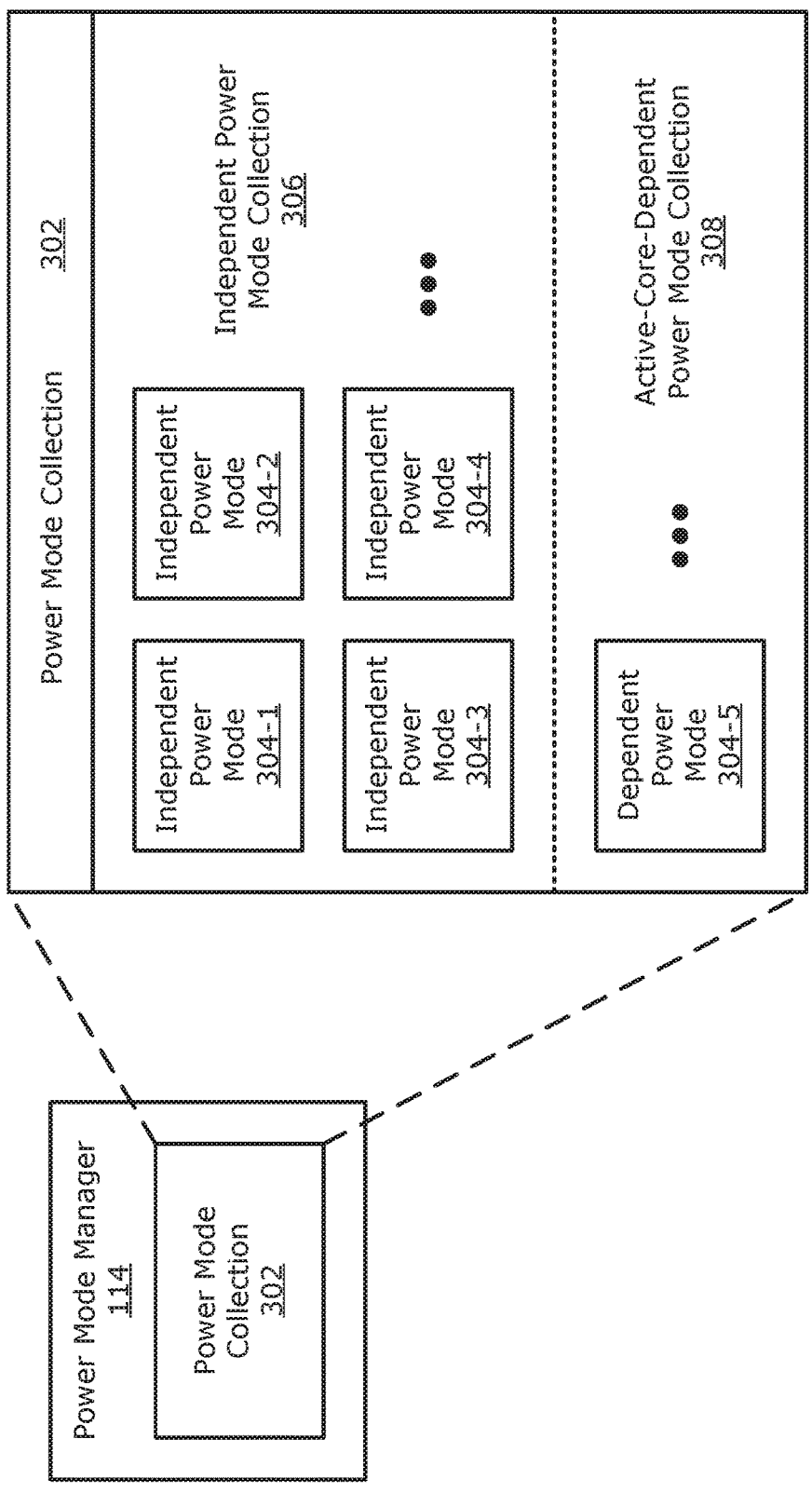
FIG. 3 illustrates an example power mode collection that bifurcates power modes into two different kinds of power modes.

FIG. 3 illustrates an example power mode collection 302 that bifurcates power modes 304 into two different kinds of power modes. The power mode manager 114 includes or can realize implementation of the power modes 304 of the power mode collection 302. The power mode manager 114 effectively bifurcates the power modes 304 into an independent power mode collection 306 and an active-core-dependent power mode collection 308. The independent power mode collection 306 includes multiple independent power modes, and the active-core-dependent power mode collection 308 includes at least one dependent power mode.

As illustrated, the independent power mode collection 306 includes four independent power modes 304-1, 304-2, 304-3, and 304-4. The active-core-dependent power mode collection 308 includes one dependent power mode 304-5. However, more or fewer power modes of either kind may alternatively be implemented. For purposes of explanation, these five power modes 304-1 to 304-5 may correspond to the five power modes (1)-(5) as presented in Table 1 above and shown in FIG. 2.

In example embodiments, an independent power mode of the independent power mode collection 306 can be triggered for activation independently of how many cores 102 of FIG. 1 are currently active. The voltage and frequency pairs of the independent power modes are established such that the integrated circuit 100 can be safely operated regardless of how many cores 102 are currently active. A dependent power mode, on the other hand, is triggered in dependence on a number of cores 102 that are currently active. If too many cores 102 are currently active (e.g., if greater than a threshold number of cores are currently active), one or more dependent power modes of the active-core-dependent power mode collection 308 are disallowed from being activated. The integrated circuit 100 can be safely operated at the boosted voltage and frequency pair of the corresponding dependent power mode 304-5, as long as the corresponding threshold number of active cores is satisfied.

However, if the dependent power mode 304-5 is active, and if a deficit between a desired and a provided level of performance precipitates activation of an additional core 102, the core activation is stalled until the boosted voltage or the boosted frequency is sufficiently lowered to enable the stalled core 102 to be safely activated. To justify this stall time, activation or deactivation of a dependent power mode can be accelerated as described herein.

Figure 4:
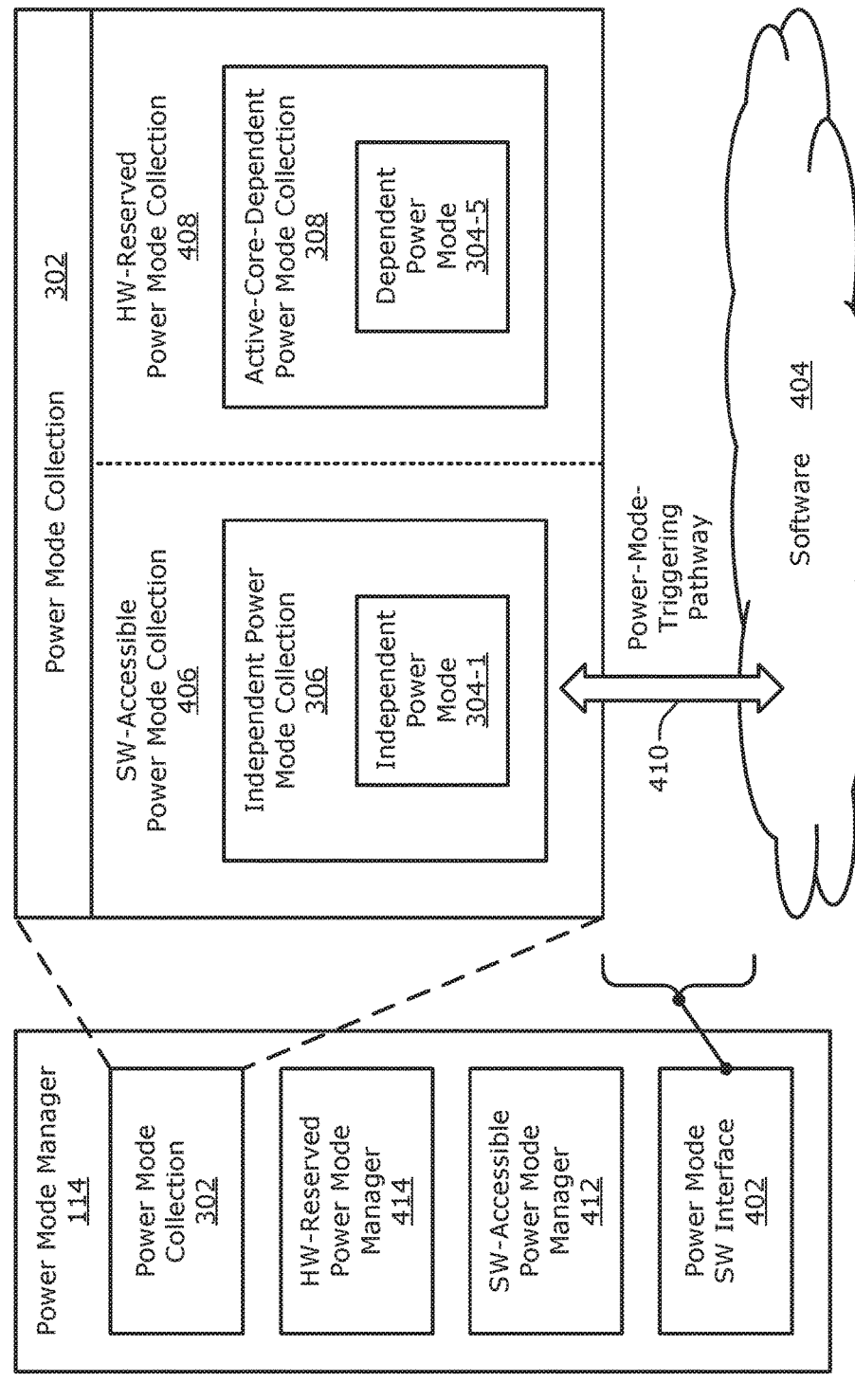
FIG. 4 illustrates a power management approach with an interaction between an example power mode manager and software with respect to an example power mode collection that bifurcates power modes into two different types of power modes.

FIG. 4 illustrates a power management approach with an interaction between an example power mode manager 114 and software 404 with respect to another example power mode collection 302. This power mode collection 302 bifurcates power modes 304 into two different types. The power mode manager 114 includes the power mode collection 302, a hardware-reserved power mode manager 414, a software-accessible power mode manager 412, and a power mode software interface 402. The power mode manager 114 is realized in hardware using the circuitry of the integrated circuit 100. The software 404 can execute on the integrated circuit 100. Examples of the software 404 include an operating system, a library, a utility, an application, and an add-in or extension to an application.

In example embodiments, the power mode manager 114 enables activation of the power modes of the power mode collection 302. The power mode manager 114 effectively bifurcates the power modes 304 into a software-accessible power mode collection 406 and a hardware-reserved power mode collection 408. To activate an additional core if the integrated circuit 100 is operating with a boosted voltage or a boosted frequency of a dependent power mode, the boosted voltage or the boosted frequency is lowered until the integrated circuit 100 can be safely operated with an additional active core. Because the new core is stalled while the boosted voltage or the boosted frequency is lowered, response time for exiting a dependent power mode is an issue. Consequently, the dependent power mode 304-5 is assigned to the hardware-reserved power mode collection 408.

The power mode collection 302 of FIG. 4 is organized by aligning different power mode kinds, such as the independent and the dependent ones described with reference to FIG. 3, with different power mode types, such as the software-accessible and the hardware-reserved ones. The independent power mode collection 306 is aligned with the software-accessible power mode collection 406. The active-core-dependent power mode collection 308 is aligned with the hardware-reserved power mode collection 408. Thus, the software 404 is granted access to trigger the activation of the independent power mode 304-1 of the independent power mode collection 306. The hardware may also have access to trigger the activation of the independent power mode 304-1. In contrast, the software 404 is excluded from being empowered to trigger activation of the dependent power mode 304-5, but the hardware of the integrated circuit 100 can trigger activation of the dependent power mode 304-5.

In operation, the hardware-reserved power mode manager 414 is capable of managing the dependent power modes, including triggering activation of the dependent power mode 304-5. The power mode triggering (e.g., as represented by the rightward arrow 206 in the lower graph 204 of FIG. 2) is based on a current number of active cores and a threshold number of active cores. Example triggering scenarios are described with reference to FIGS. 6 and 8. The hardware-reserved power mode manager 414 can trigger activation of the dependent power mode 304-5 and activate the dependent power mode 304-5 in less than one millisecond (<1 ms), or even in less than 500 microseconds (<500 μs). The hardware-reserved power mode manager 414 is also capable of managing voltage and frequencies while a dependent power mode is active and of handling a downscaling out of or an exit from a boosted power state. These aspects are described with reference to FIGS. 7 and 8.

The power mode software interface 402 creates or realizes a power-mode-triggering pathway 410. The power-mode-triggering pathway 410 provides a communication mechanism between the hardware and the software to enable the software 404 to trigger activation of the independent power mode 304-1. As shown, there is no corresponding pathway to enable the software 404 to trigger the dependent power mode 304-5. However, the software-accessible power mode manager 412 is capable of activating the independent power mode 304-1 responsive to an instruction from the software 404. The software-accessible power mode manager 412 is further capable of managing the implementation of or a modification to the independent power mode 304-1. The software 404 is empowered to switch between independent power modes, activate a core, deactivate a core, and so forth. Examples of software interaction with the software-accessible power mode manager 412 are described below with reference to FIG. 7.

Figure 5:
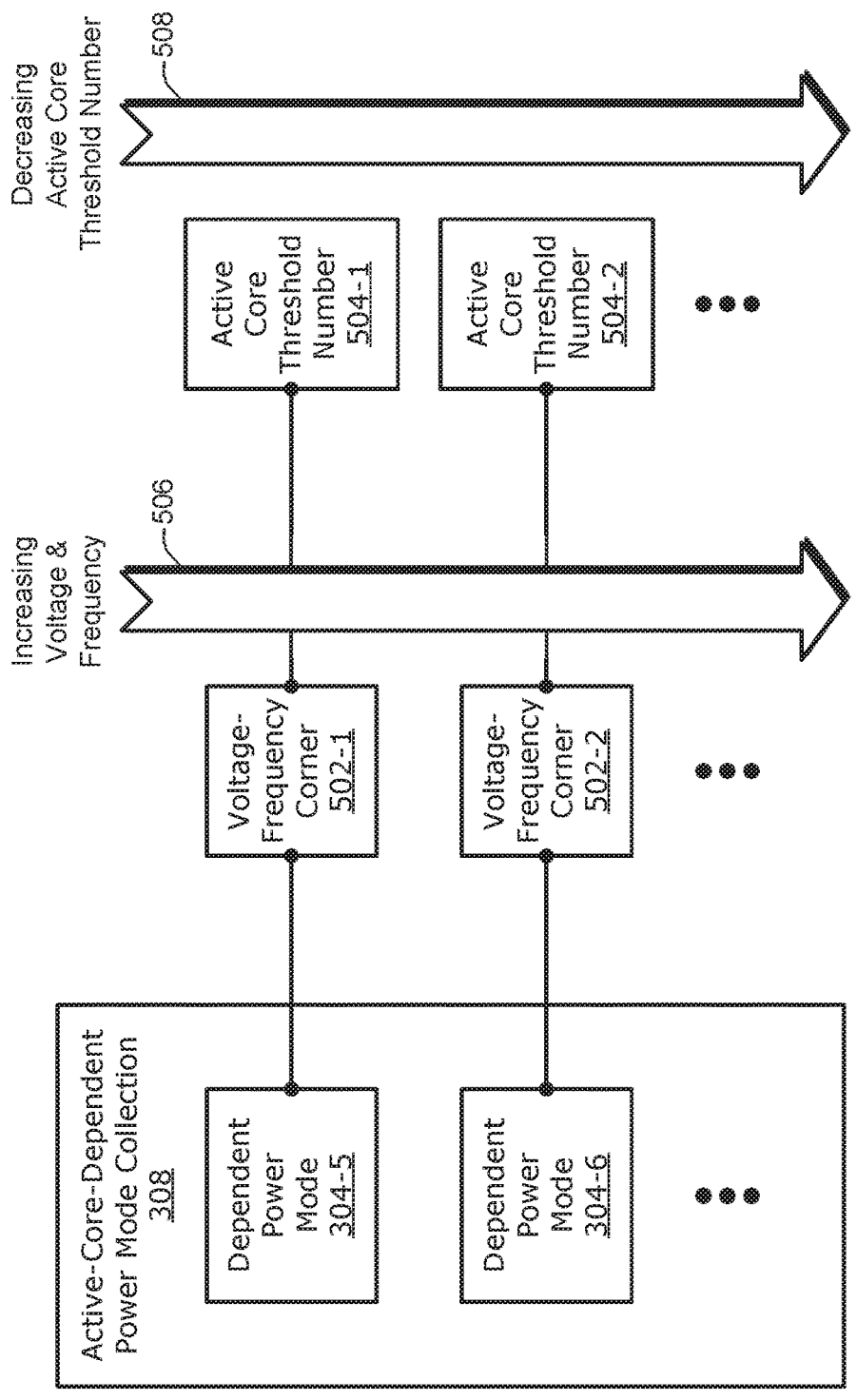
FIG. 5 illustrates example aspects of an active-core-dependent power mode collection.

FIG. 5 illustrates generally at 500 example aspects of an active-core-dependent power mode collection 308. In this implementation, the active-core-dependent power mode collection 308 includes multiple dependent power modes: a first dependent power mode 304-5 and a second dependent power mode 304-6. Each dependent power mode corresponds to a voltage-frequency corner 502 and an active core threshold number 504. Specifically, the first dependent power mode 304-5 corresponds to a first voltage-frequency corner 502-1 and a first active core threshold number 504-1. The second dependent power mode 304-6 corresponds to a second voltage-frequency corner 502-2 and a second active core threshold number 504-2.

As indicated by an arrow 506, the voltage and the frequency increase in a downward direction. As indicated by an arrow 508, the threshold number of active cores to permit activation of the corresponding dependent power mode decreases in the downward direction. Thus, the voltage and the frequency of the second voltage-frequency corner 502-2 are greater than the voltage and the frequency, respectively, of the first voltage-frequency corner 502-1. The active core threshold number 504-2 is less than the active core threshold number 504-1. In other words, more cores can be currently active for the first dependent power mode 304-5 than for the second dependent power mode 304-6.

Example values for the active-core-dependent power mode collection 308 of FIG. 5 are provide below by way of explanation. The first voltage-frequency corner 502-1 may have values of 0.95 Volts and 1.9 GHz with the first active core threshold number 504-1 being three (e.g., of four total cores 102). The second voltage-frequency corner 502-2 may have values of 0.98 Volts and 2.0 GHz with the second active core threshold number 504-2 being two (e.g., of four total cores 102). The second dependent power mode 304-6 therefore offers a higher performance level at a given number of active cores, but the second dependent power mode 304-6 also likely generates more current or heat. In this scenario, the first dependent power mode 304-5 can be activated if the number of currently-active cores is three or fewer. The second dependent power mode 304-6, however, can be activated if the number of currently-active cores is two or fewer. Although two different dependent power modes are shown, more or fewer may alternatively be implemented for an active-core-dependent power mode collection 308. For example, a third dependent power mode (not shown) may have still higher values for the voltage and the frequency, but with a still lower active core threshold number like one.

Figure 6:
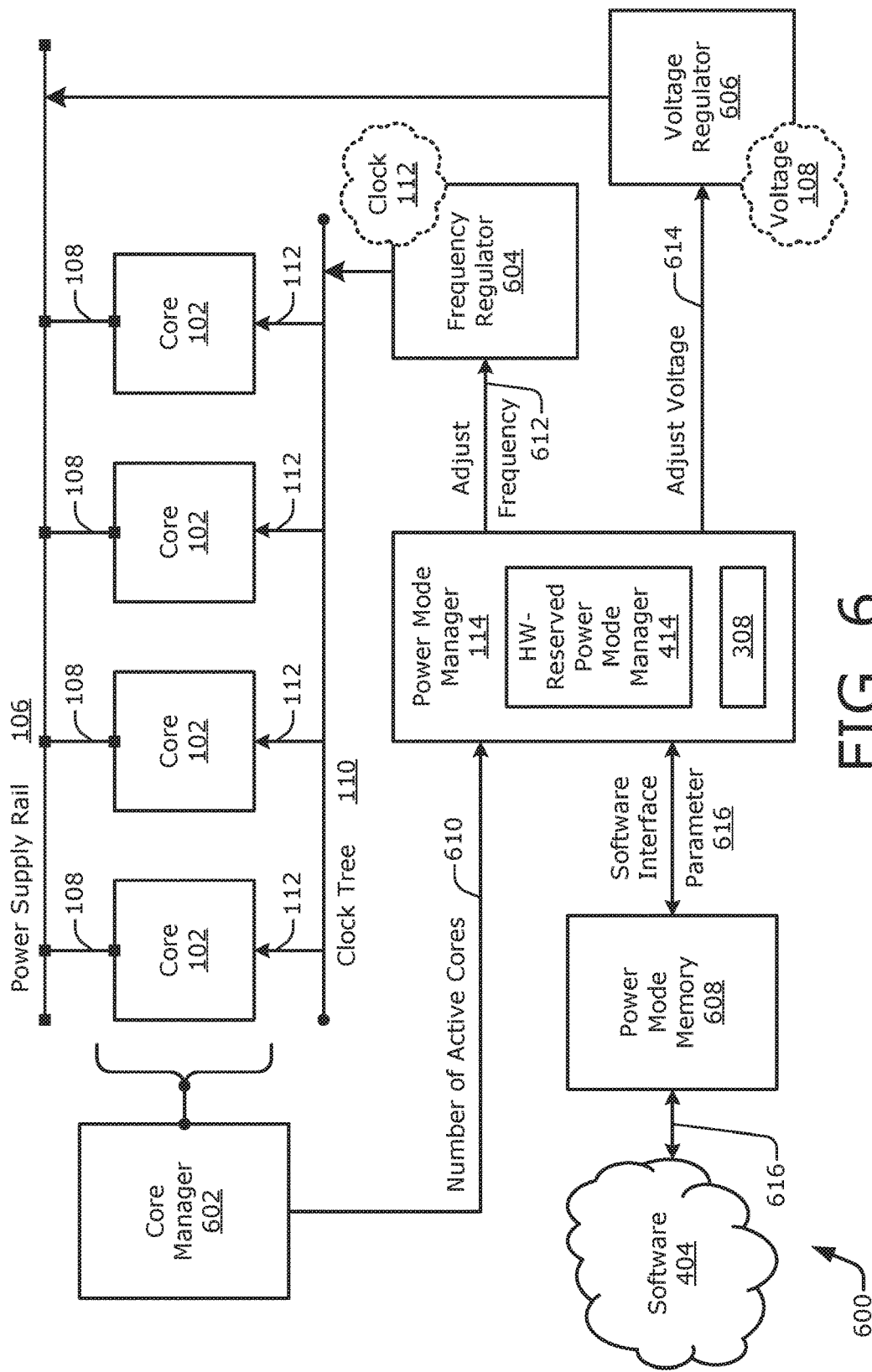
FIG. 6 illustrates an example power management scheme applied to multiple cores of an integrated circuit.

FIG. 6 illustrates an example power management scheme 600 applied to multiple cores 102 of an integrated circuit. The integrated circuit (not separately indicated in FIG. 6) includes four cores 102, the power supply rail 106 that propagates the supply voltage 108, the clock tree 110 that propagates the clock signal 112, and the power mode manager 114. The power management scheme 600 further includes a core manager 602, a frequency regulator 604, a voltage regulator 606, and a power mode memory 608 disposed on the integrated circuit. The software 404 can be executing on the integrated circuit.

The cores 102 may alternatively number more or less than the illustrated four and may be organized into multiple different clusters of two or more cores, an example of which is shown in FIG. 1. The cores 102 may also be of different sizes or processing capabilities. The frequency regulator 604 generates or provides the clock signal 112 at an adjustable frequency to each of the multiple cores 102 via the clock tree 110. An example of the frequency regulator 604 is a phase-locked loop (PLL) unit. The voltage regulator 606 generates or provides power to the multiple cores 102 via the power supply rail 106 that is held at the supply voltage 108, which can be adjusted by the voltage regulator 606. An example of the voltage regulator 606 is a power management integrated circuit (PMIC). The illustrated components may be integrated together on a single chip. Alternatively, one or more components, such as the voltage regulator 606, may be disposed on a separate integrated circuit.

The core manager 602 monitors the cores 102 for whether a given core 102 is asleep or awake. The core manger 602 can also be capable of activating for a wake state or deactivating for a sleep state individual ones of the multiple cores 102. For example, the core manager 602 may turn off power to a particular core 102 or gate the clock signal 112 to a core 102 to reduce power consumption by the core 102. These power management functions may be performed responsive to control signals provided by the power mode manager 114. Regardless, the core manager 602 is aware of how many cores 102 of the multiple cores are currently active. The core manager 602 provides a number of active cores signal 610 to the power mode manager 114. As shown, the power mode manager 114 includes at least the hardware-reserved power mode manager 414 and the active-core-dependent power mode collection 308.

In an example operation, the hardware-reserved power mode manager 414 obtains the number of currently-active cores from the number of active cores signal 610. As used herein, the "number of active cores" may be singular, or at least as low as one active core. The hardware-reserved power mode manager 414 performs a comparison including the number of active cores and an active core threshold, such as the second active core threshold number 504-2 of FIG. 5. Based on the comparison, the hardware-reserved power mode manager 414 conditionally triggers for activation a dependent power mode, such as the second dependent power mode 304-6 of FIG. 5, to boost a voltage or a frequency for those cores 102 that are active. The hardware-reserved power mode manager 414 can trigger activation of a dependent power mode if the number of currently-active cores comports with the active core threshold number (e.g., if the number of active cores is less than or equal to the active core threshold number).

In example implementations, the dependent power mode corresponds to a boosted voltage level and a boosted frequency level that each exceeds any of the voltages or frequencies of the independent power modes. If the number of active cores comports with (e.g., is less than) the active core threshold number, the hardware-reserved power mode manager 414 triggers activation of the dependent power mode. To activate the triggered dependent power mode, the hardware-reserved power mode manager 414 generates or issues an adjust voltage command 614 to adjust a voltage level of the supply voltage 108 provided by the voltage regulator 606. The adjust voltage command 614 is transmitted across a metallic line to the voltage regulator 606. Examples of a metallic line include a metal wire, a trace, a cable, or a combination thereof. If the voltage regulator 606 is on a different integrated circuit, the adjust voltage command 614 can be transmitted via a metallic line that extends over part of a printed circuit board (PCB). The adjust voltage command 614 causes the voltage regulator 606 to increase the supply voltage 108 to a boosted voltage level corresponding to the triggered dependent power mode.

To avoid unpredictable operation, the boosted voltage is generated and applied to the active cores 102 prior to the frequency being increased to the boosted frequency level. Thus, after the boosted voltage level has been attained by the voltage regulator 606, a boosted frequency level is instituted. The hardware-reserved power mode manager 414 generates or issues an adjust frequency command 612 to adjust a frequency level of the clock signal 112 provided by the frequency regulator 604. The hardware-reserved power mode manager 414 transmits the adjust frequency command 612 across a metallic line to the frequency regulator 604. The adjust frequency command 612 causes the frequency regulator 604 to increase the frequency of the clock signal 112 to the boosted frequency level corresponding to the triggered dependent power mode.

The hardware-reserved power mode manager 414 may perform the active core comparison analysis or adjust the voltage and the frequency if the software indicates that a current performance level fails to meet a current requested workload. Even after entering a boosted state, the boosted voltage-frequency corner may nevertheless fail to provide a performance level that meets a requested workload. Further, an increase in application usage may cause the software to request a standard power mode adjustment that supersedes the boost state of the hardware-based dependent power mode. In either case, the power mode manager 114 can permit at least one additional core to be activated. If the additional core is to cause the number of active cores to exceed the active core threshold number for an activated dependent power mode, the boosted state of the dependent power mode is at least partially exited prior to activating another core.

To exit the boosted state of the dependent power mode rapidly and therefore reduce a stall time for a core to be activated, the hardware-reserved power mode manager 414 first sends an adjust frequency command 612 to the frequency regulator 604 to cause the frequency regulator 604 to adjust the clock signal 112 to a safe frequency level. The safe frequency level is sufficiently low such that the stalled core can be activated even before the voltage level of the supply voltage 108 is reduced. After the safe frequency is reached, the hardware-reserved power mode manager 414 can initiate the awakening of at least one core 102. The hardware-reserved power mode manager 414 also commands the voltage regulator 606 to lower the supply voltage 108 to a non-boosted voltage level of a selected independent power mode.

After the target voltage level of the independent power mode is attained by the voltage regulator 606, the frequency of the clock signal 112 can be adjusted to the corresponding non-boosted frequency level of the selected independent power mode (e.g., raised to a clock frequency corresponding to a low, medium, high, or turbo independent power mode). The voltage reduction process can be performed in parallel with the frequency adjustment process. However, because frequency adjustments can be implemented orders of magnitude faster than voltage adjustments, dropping the frequency to a safe frequency level enables the newly-activated core to be awakened more quickly, which reduces a stall time. Example aspects and orders for entering and exiting a dependent power mode are described below with reference to FIG. 8.

In example implementations, the power mode memory 608 is accessible by the software 404 and the power mode manager 114. The power mode memory 608 enables an exchange or transfer of a software interface parameter 616 between the two. More specifically, the software 404 is empowered to provide instructions to the power mode manager 114 via the power mode memory 608 or to receive feedback or a status from the power mode manager 114 via the power mode memory 608. The power mode memory 608 includes multiple memory locations, such as fields or register entries, that can be written to or read from by the software 404 or the power mode manager 114. The power mode memory 608 is an example of a mechanism to establish the power mode triggering pathway 410 of FIG. 4. Via the power mode memory 608, the power mode manager 114 can therefore obtain an instruction or other software interface parameter 616 from the software 404.

Although the software 404 is excluded from being able to trigger activation of a dependent power mode, the software 404 may be empowered to establish one or more operational settings for employing the active-core-dependent power mode collection 308. For example, an instance of the software interface parameters 616 is a parameter that enables or disables the dependent power modes. In other words, the software 404 may be empowered to make available or unavailable an active-core-dependent power mode having a boosted voltage or a boosted frequency. An enablement parameter may apply to multiple dependent power modes (e.g., up to all dependent power modes if multiple ones are available) or to selected individual dependent power modes.

Another instance of the software interface parameters 616 empowers the software 404 to set an active core threshold number by placing a value in a location of the power mode memory 608. Yet another instance of the software interface parameters 616 is a recommendation indicator. If the software 404 provides a boost recommendation indicator, the power mode manager 114 may choose to follow the recommendation by having the hardware-reserved power mode manager 414 trigger activation of a dependent power mode or may choose to ignore the recommendation. The power mode manager 114 has access to the power mode memory 608 and retrieves software interface parameters 616, such as an active core threshold number or a boost recommendation indicator.

The power mode memory 608 can also be used to communicate software interface parameters 616 pertaining to utilization of the independent power mode collection 306. With the independent power mode collection 306 being aligned with the software-accessible power mode collection 406 (of FIG. 4), the software 404 is empowered to trigger activation of the independent power modes. Furthermore, the software 404 can deactivate an independent power mode, activate a core to awaken the core, deactivate a core to put the core to sleep, and so forth. Instructions to implement this functionality can be provided from the software 404 to the software-accessible power mode manager 412 via the software interface parameters 616 of the power mode memory 608. Confirmations may be provided in the reverse direction. For example, confirmation of entering an independent power mode may be provided by the software-accessible power mode manager 412 to the software 404 by the software-accessible power mode manager 412 storing a confirmation indicator as a software interface parameter 616.

Figure 7:
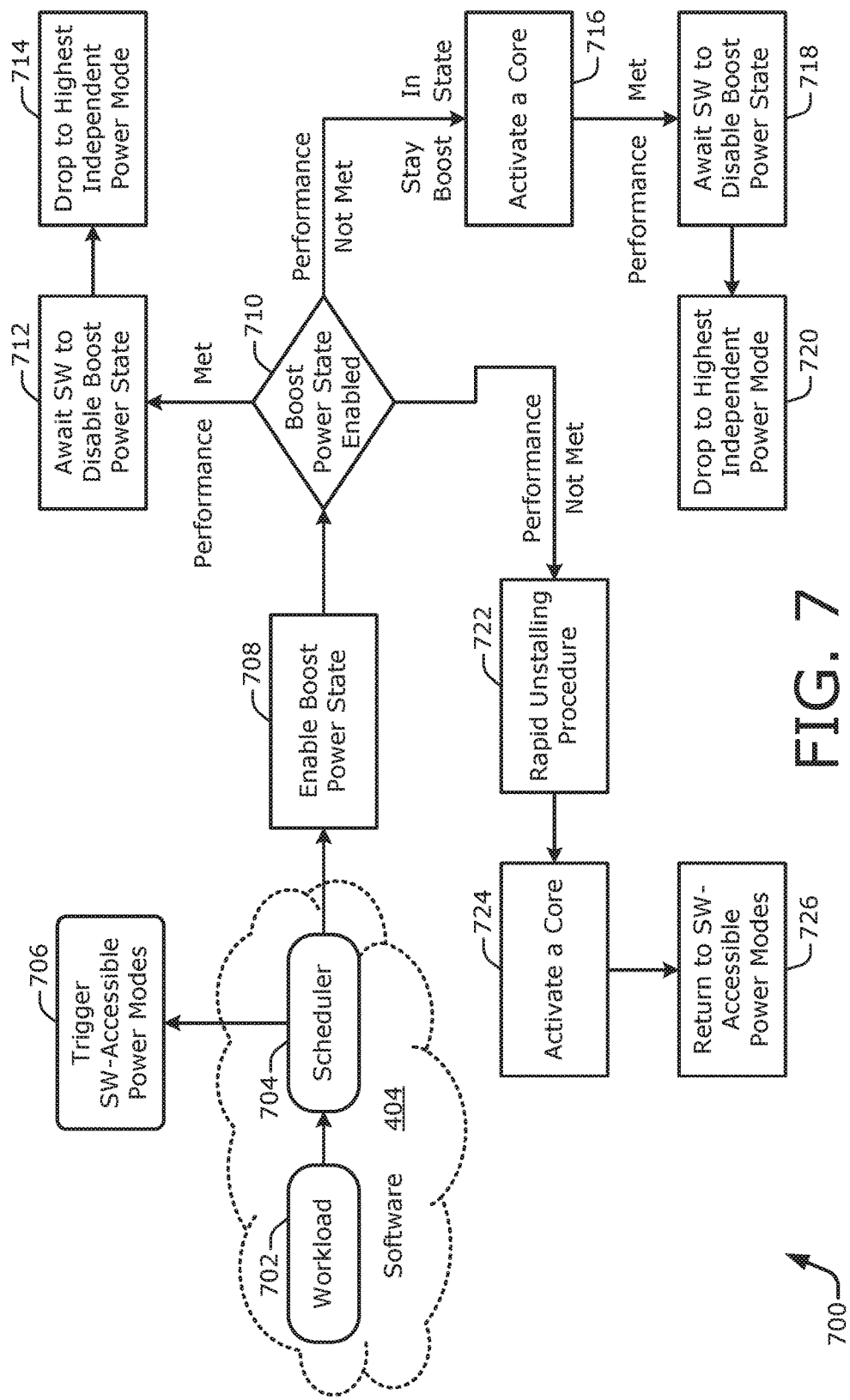
FIG. 7 illustrates an example flow diagram for entering and operating within a boosted power state for a power mode that is dependent on a number of active cores.
Figure 8:
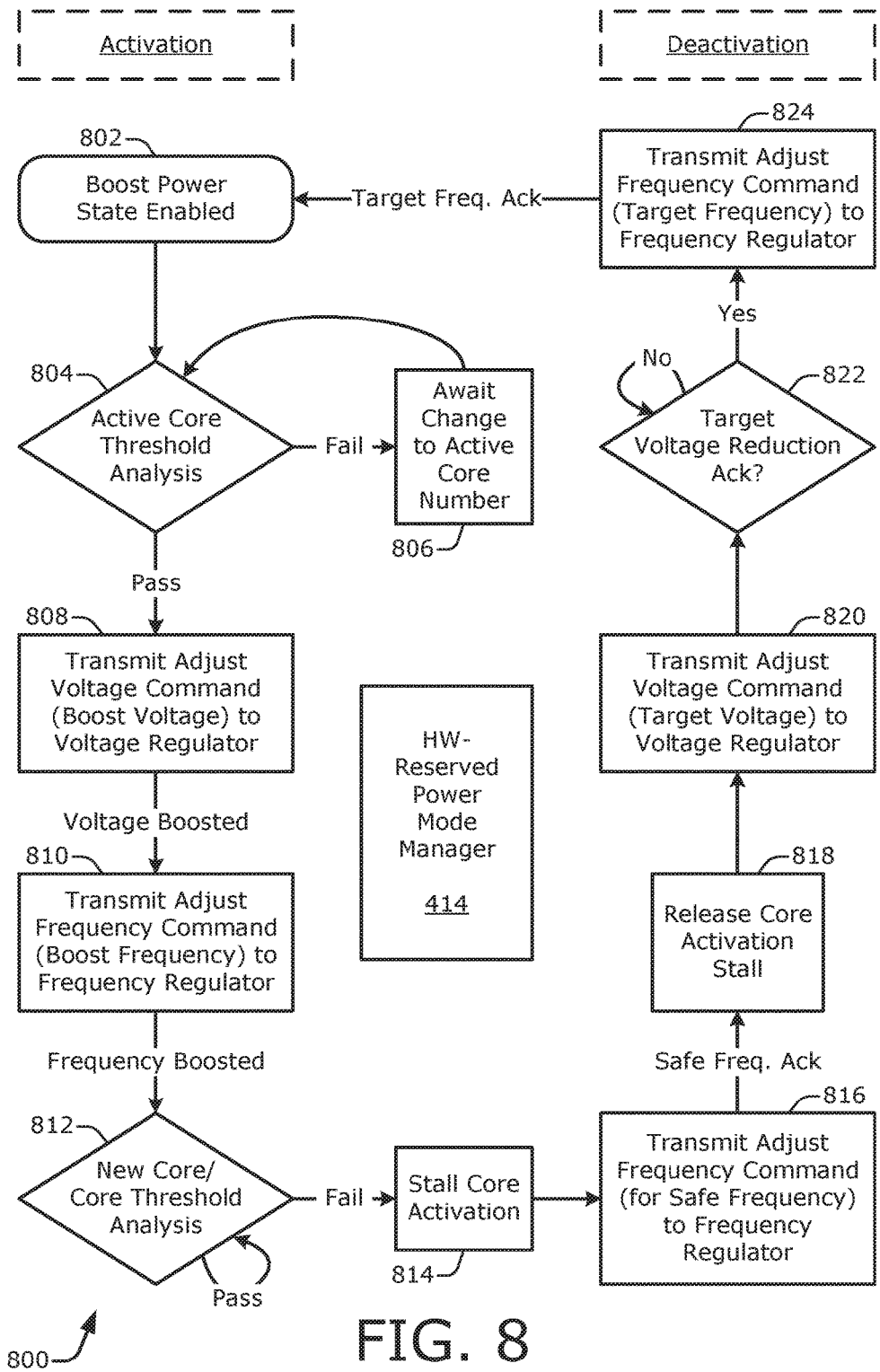
FIG. 8 illustrates an example flow diagram for activating and deactivating a dependent power mode that boosts a voltage-frequency corner.
Figure 9:
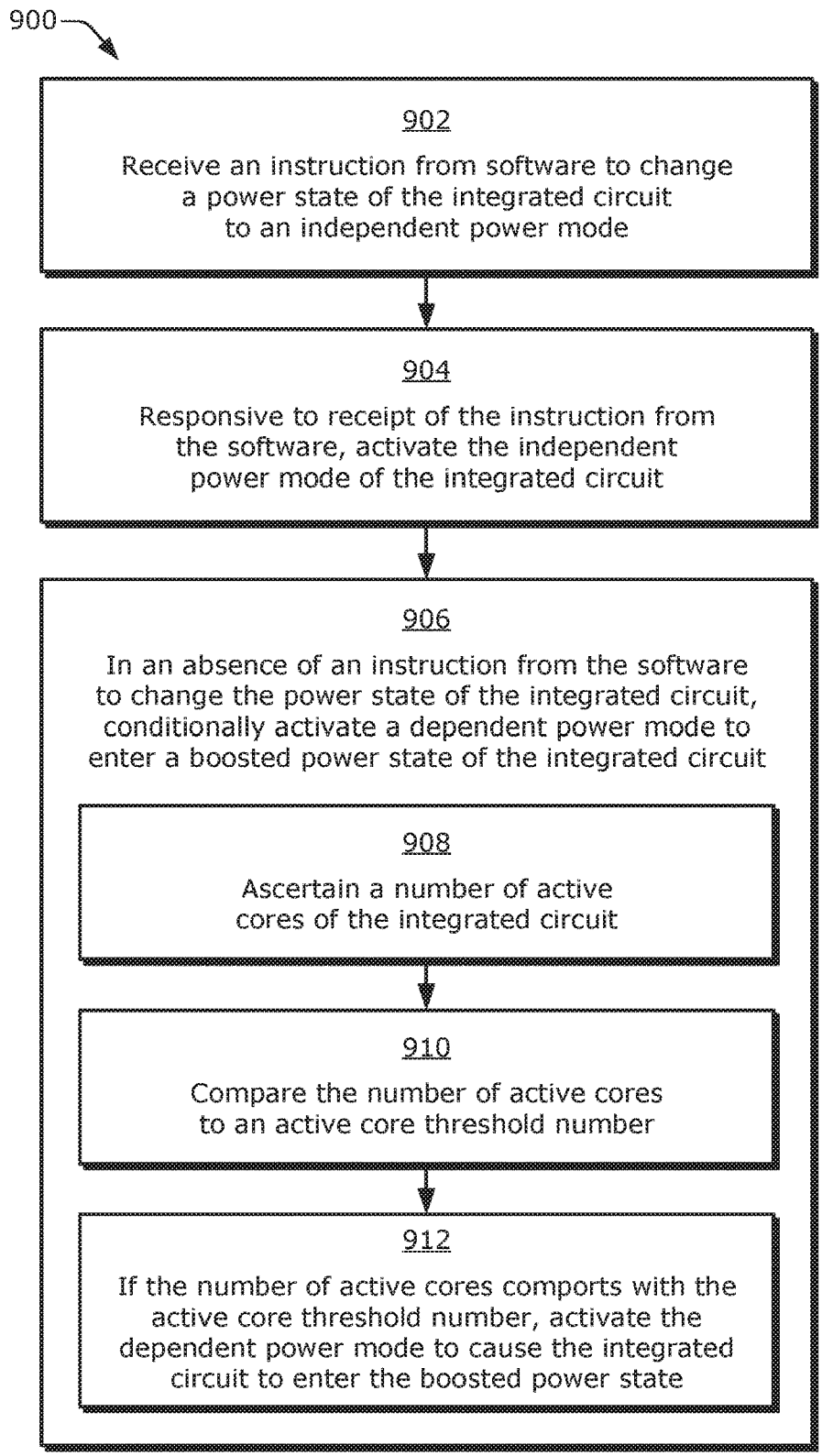
FIG. 9 is a flow diagram illustrating an example process for an active-core-based performance boost.

FIGS. 7-9 depict flow diagrams directed to various aspects of active-core-based performance boosting. These flow diagrams are illustrated in the drawings and described herein using multiple blocks that indicate operations that may be performed or states that may be taken by an integrated circuit. However, occurrence of the operations and states are not necessarily limited to the orders illustrated in FIGS. 7-9 or described herein, for the operations and states may be implemented in alternative orders or in fully or partially overlapping manners.

FIG. 7 illustrates an example flow diagram 700 for entering and operating within a boosted power state for a power mode that is active-core-dependent. FIG. 7 includes a depiction of the software 404. The software 404 includes a workload 702 and a scheduler 704. The workload 702 corresponds to an application or other code executing on an integrated circuit. The scheduler 704 corresponds to a software module that allocates processing resources, such as threads and processor availability, to various sources of the workload 702. The scheduler 704 may be part of an operating system.

The workload 702 is dynamic and corresponds to an instruction stream, processor utilization, events occurring within or as a result of code, and so forth. Based on changes to the workload 702, the scheduler 704 triggers activation of different independent power modes of the software-accessible power mode collection 406 as indicated at block 706. Meanwhile, the scheduler 704 may also enable a boosted power state or make available a dependent power mode at block 708. For example, the scheduler 704 can write a software interface parameter 616 into the power mode memory 608 of FIG. 6 that is indicative of the boosted power state being enabled. Although the software 404 is empowered to enable or disable the boosted power state in this example, the software 404 is nevertheless excluded from triggering activation of a dependent power mode having a boosted voltage or a boosted frequency.

At block 710, the integrated circuit is in a condition in which the boosted power state is enabled. Accordingly, if a number of currently-active cores comports with a threshold number of active cores, the hardware-reserved power mode manager 414 activates a dependent power mode so as to operate at a corresponding boosted voltage and boosted frequency. With the increased performance being provided by the boosted processing of the integrated circuit, it is possible that the demands of the workload 702 are met. Moving upward from the block 710, if the workload performance is met, then at block 712 the power mode manager 114 can wait for the software 404 to disable the boosted power state. If the scheduler 704 writes a boost-power-state disable indication into the power mode memory 608, the power mode manager 114 drops back to the highest independent power mode at block 714. For example, with reference to Table 1 and FIG. 2, the power mode manager 114 can drop from the fifth power mode (5) to the fourth power mode (4).

On the other hand, even with the increased performance being provided by the enabled boost power state of the integrated circuit, it is possible that the demands of the workload 702 are not met. Moving rightward from the block 710, the hardware-reserved power mode manager 414 remains in the boosted state. Thus, the integrated circuit continues in a dependent power mode that permits up to, e.g., three active cores. Here, two cores are currently active. So at block 716 the hardware-reserved power mode manager 414 wakes up a third core. Activating the third core increases the boosted processing performance without exiting the dependent power mode or violating the example active core threshold number of three. After activating the third core, the demands of the workload 702 are met. Consequently, the power mode manager 114 can await the boost power state being disabled by the software 404 as indicated at block 718 and then drop back to a highest independent power mode as indicated at block 720 in manners analogous to those of blocks 712 and 714, respectively.

Although not illustrated in FIG. 7, another option to address a situation in which performance is not met is to increase a boosted voltage or a boosted frequency by switching to a higher dependent power mode. For example, with reference to FIGS. 4 and 5, the hardware-reserved power mode manager 414 can trigger activation of the second dependent power mode 304-6 to migrate from the first voltage-frequency corner 502-1 to the second voltage-frequency corner 502-2, if the second active core threshold number 504-2 is currently met.

Yet another option to address a situation in which performance is not met is shown in the flow diagram 700 moving downward from the block 710. At block 722, a rapid unstalling procedure is implemented to enable another core to be activated when activation of that core with a currently-active dependent power mode would violate the corresponding threshold number of active cores. Briefly, a rapid unstalling procedure entails reducing a clock signal 112 to a safe frequency level and initiating a reduction of a supply voltage 108 to a voltage level corresponding to an independent power mode of the software-accessible power mode collection 406. The procedure also entails activating a core 102 of the multiple cores after the clock signal 112 is reduced to the safe frequency as indicated at block 724. Further, after the supply voltage 108 is reduced to the voltage level corresponding to the independent power mode, the clock signal 112 is increased from the safe frequency level to the target frequency level corresponding to the independent power mode. At block 726, the power mode manager 114 can thus return to the independent power modes of the software-accessible power mode collection 406. The scheduler 704 continues to be empowered to trigger the software-accessible, independent power modes, like in block 706.

FIG. 8 illustrates an example flow diagram 800 for activating and deactivating a dependent power mode that boosts a voltage-frequency corner. The operations of the flow diagram 800 can be performed by, for example, the hardware-reserved power mode manager 414. Generally, the operations in the left column pertain to activation of a dependent power mode, and the operations in the right column pertain to deactivation of the dependent power mode. At block 802, a boost power state option is enabled, such as if the software 404 stores a hardware-boost enablement indicator in the power mode memory 608 of FIG. 6.

At block 804, an active core threshold analysis is conducted to determine if a number of currently-active cores 102 matches (e.g., is equal to or is less than or equal to) an active core threshold number 504. If there is not a match, the active core threshold analysis fails and the power mode manager 114 awaits a change in the number of active cores at block 806. After there is a change to the number of active cores, the active core threshold analysis is conducted again at block 804. On the other hand, if there is a match with the active core threshold number, the active core threshold analysis is passed at block 804, and activation of a dependent power mode 304-5 is initiated. To initiate the dependent power mode activation, the hardware-reserved power mode manager 414 transmits an adjust voltage command 614 (to generate a boosted voltage) to a voltage regulator 606 at block 808. The hardware-reserved power mode manager 414 waits for confirmation that the boosted voltage has been provided to the cores 102 because if the frequency is increased beyond an acceptable level for any give voltage level, unpredictable or harmful operation of the integrated circuit can result. After obtaining confirmation that the boosted voltage has been established, the hardware-reserved power mode manager 414 transmits an adjust frequency command 612 (to generate a boosted frequency) to a frequency regulator 604 at block 810.

After the boosted frequency has been established, the currently-active cores 102 operate at the boosted voltage at a rate that is in accordance with the boosted frequency. Because the workload changes dynamically as application usage ebbs and flows, the desired processing throughput changes. With a hardware-based performance boost, temporary increases in workload demands can be handled at the boosted power level without a performance deficiency occurring because the boosted performance level can be in effect when the increased workload is submitted to the processor. Nevertheless, eventually at some time during a given boosted power state, workload performance demands will fail to be met and activation of a new core will be requested by a scheduler. At block 812, an active core threshold analysis is conducted based on the requested new core being considered an active core. If adding the new active core still results in passing the active core threshold analysis, the new core is awakened. The boost power state continues and a request to activate another core is awaited at block 812. On the other hand, if the activation of the new core would cause a failure of the active core threshold analysis at block 812, then at block 814 the core activation or wakeup is stalled.

A rapid unstalling procedure is conducted to scale back the boosted power state so that the requested core can be activated. At block 816, the hardware-reserved power mode manager 414 transmits to the frequency regulator 604 an adjust frequency command 612 (to drop to a safe frequency). The adjust frequency command 612 can indicate that the safe frequency is to be generated by specifying a particular frequency or by providing an indicator referencing the safe frequency, such as an integer value of six if four frequency levels correspond to independent power modes and a fifth frequency level corresponds to a boosted frequency of a dependent power mode. Alternatively, an indication of the safe frequency can be made by specifying a setting, such as a coarse setting, of a PLL unit. The safe frequency is a frequency that is sufficiently low to enable the requested core 102 to be activated before the boosted voltage is reduced significantly, if at all. The safe frequency can be attained by the frequency regulator 604 using any of many different techniques. An example technique for a PLL unit is described below.

In an example PLL implementation, a coarse setting or coarse adjustment mechanism of a PLL unit is used to drop the frequency below the target frequency, which is the frequency level corresponding to the power mode being entered. The power mode being entered may be a less aggressive dependent power mode that permits an additional core to be active or an independent power mode, such as the highest independent power mode. This coarse frequency adjustment to a safe, sub-frequency of the target frequency can be achieved in approximately 100 nanoseconds (nsecs). The coarse frequency adjustment may be made using, for example, one or more capacitors of the PLL unit. Once the coarse frequency adjustment to the safe frequency is completed, the PLL unit sends a coarse frequency adjustment confirmation to the hardware-reserved power mode manager 414 so that the hardware-reserved power mode manager 414 can initiate activation of the new core.

After the voltage is also reduced, which is described below with reference to blocks 820-824, a fine setting or fine adjustment mechanism of the PLL unit is used to increase the frequency level output by the PLL unit from the safe frequency until the target frequency is locked. The fine frequency adjustment can be achieved in approximately 25 microseconds (25 μsecs). Thus, processing by the newly-activated core, or at least the initiation thereof, can proceed during the longer period consumed by the fine frequency adjustment after the coarse frequency adjustment is completed. Alternatively, the coarse setting can be used to bring the output frequency down near to—but still above—the target frequency, and the fine setting can then be used to decrease the output frequency to the target frequency. However, this latter approach produces an acceptable, usable frequency level more slowly than does the former approach.

With continuing reference to the flow diagram 800, after the attainment of the safe frequency by the frequency regulator 604 is acknowledged to the power mode manager 114, the stall of the core activation can be released at block 818. The core manager 602 can therefore activate the requested core 102. At block 820, the hardware-reserved power mode manager 414 transmits an adjust voltage command 614 (for a target voltage level) to the voltage regulator 606. The adjust voltage command 614 causes the voltage regulator 606 to lower the output voltage to a voltage level corresponding to a targeted power mode, such as a triggered independent power mode. At block 822, the power mode manager 114 waits to receive from the voltage regulator 606 an acknowledgement that the voltage has been reduced to the target voltage level. After receiving the target voltage reduction acknowledgement, the hardware-reserved power mode manager 414 knows that the frequency can be safely brought up to the target frequency level. Accordingly, at block 824 the hardware-reserved power mode manager 414 transmits to the frequency regulator 604 an adjust frequency command 612 (for a target frequency level) to increase the output frequency to a level corresponding to the targeted power mode. After an acknowledgment is received that the target frequency has been attained, the hardware-reserved power mode manager 414 can return to the boost enabled state at block 802 to perform additional core threshold analyses at block 804.

FIG. 9 is a flow diagram illustrating an example process 900 for an active-core-based performance boost. The process 900 includes blocks 902-912. Operations represented by the illustrated blocks of the process 900 may be performed by an integrated circuit, such as an integrated circuit 100 of FIG. 1 or an integrated circuit 1010 of FIG. 10, which is described below. More specifically, the operations of the process 900 may be performed by a power mode manager 114 of FIGS. 1, 3, 4, and 6.

At block 902, an instruction is received from software to change a power state of the integrated circuit to an independent power mode. For example, an integrated circuit 100 can receive an instruction from software 404 to change a power state of the integrated circuit 100 to an independent power mode 304-3 by triggering activation of the independent power mode 304-3. A scheduler 704 of the software 404 may store a software interface parameter 616 in a location of a power mode memory 608. A power mode manager 114 may then retrieve a value of the software interface parameter 616 from the power mode memory 608, with the value triggering activation of the independent power mode 304-3.

At block 904, responsive to receipt of the instruction from the software, the independent power mode of the integrated circuit is activated. For example, responsive to receipt of the instruction from the software 404, the power mode manager 114 can activate the independent power mode 304-3 of the integrated circuit 100. This activation may be performed by commanding a voltage regulator 606 to provide a voltage at a level corresponding to the targeted independent power mode 304-3 and by commanding a frequency regulator 604 to provide a frequency at a level corresponding to the targeted independent power mode 304-3.

At block 906, in an absence of an instruction from the software to change the power state of the integrated circuit, a dependent power mode is conditionally activated to enter a boosted power state of the integrated circuit. For example, in an absence of an instruction from the software 404 to change the power state of the integrated circuit 100, the hardware of the integrated circuit conditionally activates a dependent power mode 304-5 to enter a boosted power state of the integrated circuit 100. To conditionally activate the dependent power mode 304-5, the power mode manager 114 performs the operations of blocks 908-912.

At block 908, a number of active cores of the integrated circuit is ascertained. For example, the power mode manager 114 can ascertain a number of currently-active cores 102 of the integrated circuit 100. For instance, a core manager 602 may provide a number of active cores signal 610 to the power mode manager 114, with the number indicative of how many cores 102 are currently awake and powered.

At block 910, the number of active cores is compared to an active core threshold number. For example, a hardware-reserved power mode manager 414 can compare the number of active cores 102 to an active core threshold number 504.

This active core threshold analysis may be performed by the hardware repeatedly, such as at regular intervals, so that the hardware of the integrated circuit 100 can determine if or when to activate a dependent power mode without being so instructed by the software 404.

At block 912, if the number of active cores comports with the active core threshold number, the dependent power mode is activated to cause the integrated circuit to enter the boosted power state. For example, if the number of currently-active cores comports with the active core threshold number 504-1, the hardware-reserved power mode manager 414 activates the dependent power mode 304-5 to cause the integrated circuit 100 to enter the boosted power state. If, on the other hand, the number of currently-active cores does not comport with the active core threshold number 504-1 (e.g., the active core number exceeds the threshold number), the hardware-reserved power mode manager 414 refrains from activating the dependent power mode 304-5, so the integrated circuit 100 does not enter the boosted power state.

To enter the boosted power state, the hardware-reserved power mode manager 414 transmits an adjust voltage command 614 to the voltage regulator 606 to cause the voltage regulator 606 to increase an output voltage to a boosted voltage level. The hardware-reserved power mode manager 414 also transmits an adjust frequency command 612 to the frequency regulator 604 to cause the frequency regulator 604 to increase an output frequency to a boosted frequency level. The boosted voltage is provided to at least one active core 102 of the integrated circuit 100 via a power supply rail 106 as a supply voltage 108. The boosted frequency is provided to the at least one active core 102 of the integrated circuit 100 via a clock tree 110 as a clock signal 112.

In an example implementation, the process 900 also includes exposing a software-accessible power mode collection 406, which includes the independent power mode 304-3, to the software 404 to empower the software 404 to trigger activation of the independent power mode 304-3. The software-accessible power mode collection 406 can be exposed to the software 404 using, for example, a power-mode-triggering pathway 410 between the software 404 and the software-accessible power mode manager 412. The process 900 further includes withholding access to an active-core-dependent power mode collection 308, which includes the dependent power mode 304-5, from the software 404 to deny the software 404 the ability to trigger activation of the dependent power mode 304-5. Access to the active-core-dependent power mode collection 308 can be withheld, for example, by omitting any location in the power mode memory 608 for the software 404 to use to instruct the power mode manager 114 to activate the dependent power mode 304-5.

Figure 10:
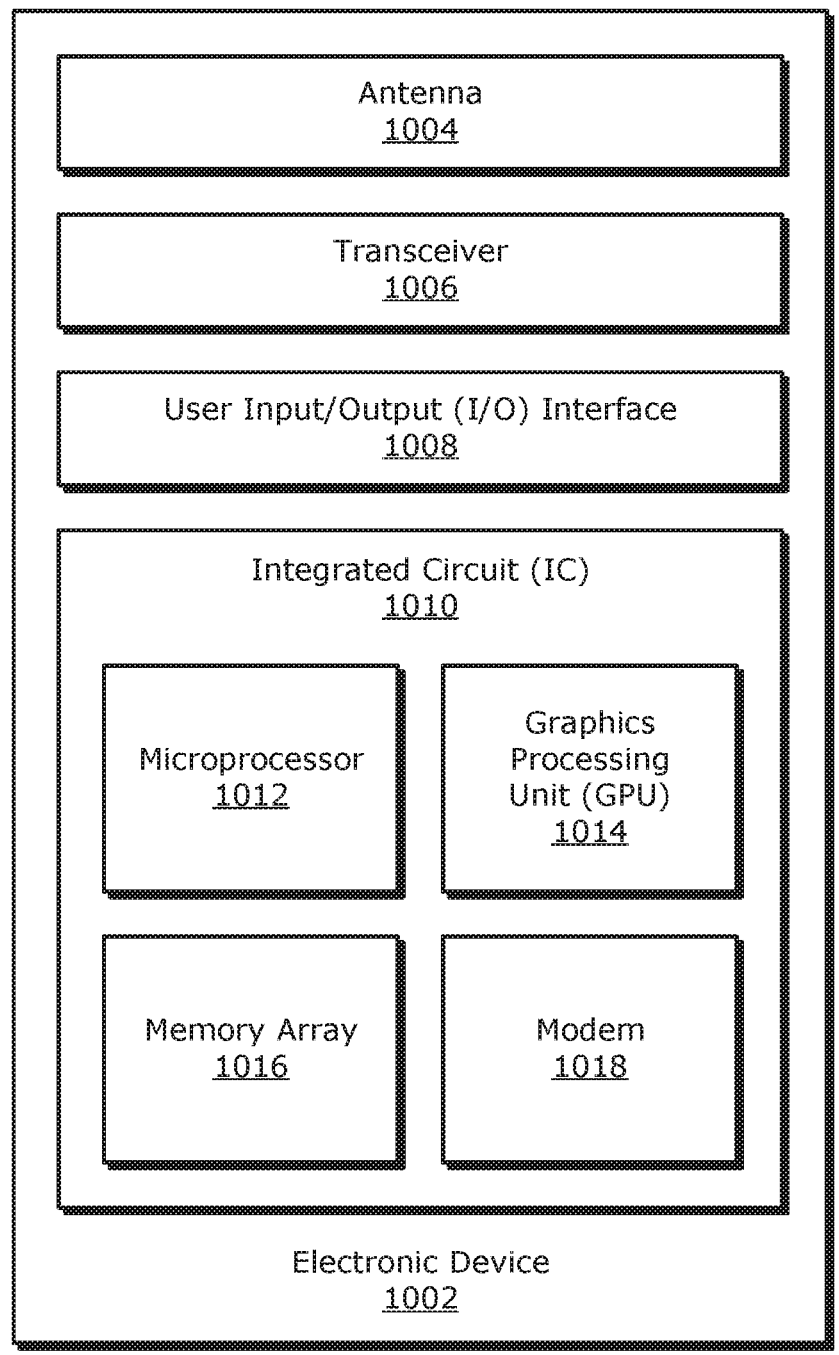
FIG. 10 depicts an example electronic device that includes an integrated circuit having multiple cores.

FIG. 10 depicts an example electronic device 1002 that includes an integrated circuit (IC) 1010 having multiple cores. As shown, the electronic device 1002 includes an antenna 1004, a transceiver 1006, and a user input/output (I/O) interface 1008, in addition to the integrated circuit 1010. Illustrated examples of the integrated circuit 1010, or cores thereof, include a microprocessor 1012, a graphics processing unit (GPU) 1014, a memory array 1016, and a modem 1018.

The electronic device 1002 may be a mobile or battery-powered device or a fixed device that is designed to be powered by an electrical grid. Examples of the electronic device 1002 include a server computer, a network switch or router, a blade of a data center, a personal computer, a desktop computer, a notebook or laptop computer, a tablet computer, a smart phone, an entertainment appliance, or a wearable computing device such as a smartwatch, intelligent glasses, or an article of clothing. The electronic device 1002 may also be a device, or a portion thereof, having embedded electronics. Examples of the electronic device 1002 with embedded electronics include a passenger vehicle, industrial equipment, a refrigerator or other home appliance, a drone or other unmanned aerial vehicle (UAV), or a power tool.

For a device with a wireless capability, the electronic device 1002 includes an antenna 1004 that is coupled to a transceiver 1006 to enable reception or transmission of one or more wireless signals. The integrated circuit 1010 may be coupled to the transceiver 1006 to enable the integrated circuit 1010 to have access to received wireless signals or to provide wireless signals for transmission via the antenna 1004. The electronic device 1002 as shown also includes at least one user I/O interface 1008. Examples of the user I/O interface 1008 include a keyboard, a mouse, a microphone, a touch-sensitive screen, a camera, an accelerometer, a haptic mechanism, a speaker, a display screen, or a projector.

The integrated circuit 1010 may comprise, for example, one or more instances of a microprocessor 1012, a GPU 1014, a memory array 1016, a modem 1018, and so forth. The microprocessor 1012 may function as a central processing unit (CPU) or other general-purpose processor. Some microprocessors include different parts, such as multiple processing cores, that may be individually powered on or off. Cores may be sufficiently similar to each other so as to be considered duplicates of each other, or cores may be different from one another. The GPU 1014 may be especially adapted to process visual-related data for display. If visual-related data is not being rendered or otherwise processed, the GPU 1014 may be fully or partially powered down. The memory array 1016 stores data for the microprocessor 1012 or the GPU 1014. Example types of memory for the memory array 1016 include random access memory (RAM), such as dynamic RAM (DRAM) or static RAM (SRAM); flash memory; and so forth. If programs are not accessing data stored in memory, the memory array 1016 may be powered down overall or block-by-block. The modem 1018 demodulates a signal to extract encoded information or modulates a signal to encode information into the signal. If there is no information to decode from an inbound communication or to encode for an outbound communication, the modem 1018 may be idled to reduce power consumption. The integrated circuit 1010 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1010 may also comprise a system on a chip (SOC). An SOC may integrate a sufficient number of different types of components to enable the SOC to provide computational functionality as a notebook computer, a mobile phone, or another electronic apparatus using one chip, at least primarily. Components of an SOC, or an integrated circuit 1010 generally, may be termed cores or blocks. A core or circuit block of an SOC may be powered down if not in use. Examples of cores or circuit blocks include, in addition to those that are illustrated in FIG. 10, a voltage regulator, a core memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a processing or GPU core, may further include multiple internal cores or circuit blocks.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A hardware system comprising:
multiple cores, each core of the multiple cores configured to be powered up if active or powered down if inactive; and
a power mode manager configured to manage a power mode collection including an independent power mode collection and an active-core-dependent power mode collection, the power mode manager including:
a software-accessible power mode manager configured to provide a power-mode-triggering pathway to enable software to trigger activation of an independent power mode of the independent power mode collection; and
a hardware-reserved power mode manager separate from the software-accessible power mode manager and configured to:
exclude the software from being able to trigger activation of a dependent power mode of the active-core-dependent power mode collection; and
trigger activation of a dependent power mode of the active-core-dependent collection based on a number of active cores of the multiple cores, wherein the dependent power mode includes a first voltage and frequency pair, and wherein the independent power mode includes a second voltage and frequency pair, further wherein voltage and frequency of the first voltage and frequency pair are both higher than voltage and frequency of the second voltage and frequency pair.

2. The hardware system of claim 1, wherein the software-accessible power mode manager is configured to provide a power mode software interface to enable the software to request that an independent power mode of the independent power mode collection be activated or deactivated.

3. The hardware system of claim 1, wherein the hardware-reserved power mode manager is configured to trigger activation of the dependent power mode if the number of active cores of the multiple cores comports with an active core threshold number.

4. The hardware system of claim 3, further comprising:
a voltage regulator coupled to the power mode manager by a metallic line, the voltage regulator configured to generate a supply voltage for the multiple cores,
wherein the hardware-reserved power mode manager is configured to transmit an adjust voltage command to the voltage regulator via the metallic line to implement the dependent power mode.

5. The hardware system of claim 3, further comprising:
a frequency regulator coupled to the power mode manager by a metallic line, the frequency regulator configured to generate a clock signal for the multiple cores,
wherein the software-accessible power mode manager is configured to transmit an adjust frequency command to the frequency regulator via the metallic line to implement the dependent power mode.

6. The hardware system of claim 1, wherein:
the active-core-dependent power mode collection includes a first dependent power mode and a second dependent power mode, the first dependent power mode corresponding to a first voltage-frequency corner and the second dependent power mode corresponding to a second voltage-frequency corner; and
the hardware-reserved power mode manager is configured to trigger activation of the first dependent power mode if the number of active cores of the multiple cores comports with a first active core threshold number and to trigger activation of the second dependent power mode if the number of active cores of the multiple cores comports with a second active core threshold number.

7. The hardware system of claim 1, wherein the power mode manager, to deactivate the dependent power mode, is configured to:
reduce a clock signal to a safe frequency;
initiate a reduction of a supply voltage to a voltage level corresponding to a targeted independent power mode of the independent power mode collection;
activate a core of the multiple cores after the clock signal is reduced to the safe frequency; and
increase the clock signal to a frequency level corresponding to the targeted independent power mode after the supply voltage is reduced to the voltage level corresponding to the targeted independent power mode.

8. The hardware system of claim 7, wherein the power mode manager, to deactivate the dependent power mode, is further configured to:
reduce the clock signal to the safe frequency using a coarse adjustment mechanism of a frequency regulator; and
increase the clock signal to the frequency level corresponding to the targeted independent power mode using a fine adjustment mechanism of the frequency regulator.

9. The hardware system of claim 7, wherein the power mode manager is further configured to activate the core of the multiple cores after the clock signal is reduced to the safe frequency and before the supply voltage is reduced to the voltage level corresponding to the targeted independent power mode.

10. The hardware system of claim 1, wherein the dependent power mode of the active-core-dependent power mode collection corresponds to a voltage-frequency corner that is higher than a voltage-frequency corner corresponding to the independent power mode of the independent power mode collection.

11. The hardware system of claim 10, wherein the dependent power mode of the active-core-dependent power mode collection corresponds to a voltage-frequency corner that is higher than any voltage-frequency corner corresponding to any independent power mode of the independent power mode collection.

12. The hardware system of claim 1, further comprising:
a power mode memory configured to be accessible by the software and the power mode manager, the power mode memory configured to enable an exchange of a software interface parameter.

13. The hardware system of claim 12, wherein the power mode manager is configured to obtain an active core threshold number from the software via the power mode memory.

14. The hardware system of claim 12, wherein the power mode manager is configured to determine if usage of the active-core-dependent power mode collection is enabled based on an indicator obtained from the software via the power mode memory.

15. A hardware system comprising:
multiple cores, each core of the multiple cores configured to be powered up if active or powered down if inactive; and
a power mode manager configured to enable activation of an independent power mode collection and an active-core-dependent power mode collection, the independent power mode collection including multiple independent power modes that are configured to be activated independently of a number of currently-active cores of the multiple cores, the active-core-dependent power mode collection including at least one dependent power mode that is configured to be activated conditioned on the number of currently-active cores of the multiple cores, the power mode manager including:
first means for triggering an activation of an independent power mode of the independent power mode collection by software; and
second means for triggering an activation of the dependent power mode of the active-core-dependent collection by hardware based on the number of currently-active cores of the multiple cores, wherein the first means are separate from the second means, and wherein the dependent power mode includes a first voltage and frequency pair, and wherein the independent power mode includes a second voltage and frequency pair, further wherein voltage and frequency of the first voltage and frequency pair are both higher than voltage and frequency of the second voltage and frequency pair.

16. The hardware system of claim 15, wherein the power mode manager comprises:
means for excluding the software from triggering an activation of the dependent power mode of the active-core-dependent power mode collection.

17. The hardware system of claim 15, wherein the second means comprises:
means for thresholding the activation of the dependent power mode based on the number of currently-active cores of the multiple cores.

18. The hardware system of claim 15, wherein the power mode manager comprises:
means for rapidly unstalling a wakeup of a core of the multiple cores if an independent power mode is being activated during a boosted power state of the dependent power mode.

19. The hardware system of claim 15, wherein the power mode manager comprises:
means for establishing an interface to communicate software interface parameters between hardware of the hardware system and the software executing on the hardware system.

20. The hardware system of claim 15, wherein the power mode manager comprises:
means for managing an enabled boost power state for an activated dependent power mode responsive to an indication of a current performance level.

21. A method by an integrated circuit to implement an active-core-based performance boost using a software-accessible power mode manager and a hardware-reserved power mode manager, the method comprising:
receiving an instruction from the software-accessible power mode manager to change a power state of the integrated circuit to an independent power mode;
responsive to receipt of the instruction from the software-accessible power mode manager, activating the independent power mode of the integrated circuit by the software-accessible power mode manager; and
in an absence of an instruction from the software-accessible power mode manager to change the power state of the integrated circuit, conditionally activating by the hardware-reserved power mode manager the dependent power mode to enter a boosted power state of the integrated circuit, wherein the hardware-reserved power mode manager is separate from the software-accessible power mode manager, the conditionally activating including:
ascertaining a number of active cores of the integrated circuit;
comparing the number of active cores to an active core threshold number; and
in response to determining that the number of active cores comports with the active core threshold number, activating by the hardware-reserved power mode manager the dependent power mode to cause the integrated circuit to enter the boosted power state, wherein the dependent power mode includes a first voltage and frequency pair, and wherein the independent power mode includes a second voltage and frequency pair, further wherein voltage and frequency of the first voltage and frequency pair are both higher than voltage and frequency of the second voltage and frequency pair.

22. The method of claim 21, further comprising:
exposing a software-accessible power mode collection, which includes the independent power mode, to the software-accessible power mode manager to empower the software-accessible power mode manager to trigger activation of the independent power mode; and withholding access to an active-core-dependent power mode collection, which includes the dependent power mode, from the software-accessible power mode manager to deny the software-accessible power mode manager an ability to trigger activation of the dependent power mode.

23. The method of claim 21, further comprising:
if the number of active cores fails to comport with the active core threshold number, refraining from activating the dependent power mode.

24. The method of claim 21, further comprising:
if the number of active cores fails to comport with the active core threshold number, activating a core of the integrated circuit to increase a performance level.

25. The method of claim 21, wherein the activating the dependent power mode comprises issuing at least one command to increase a supply voltage to a boosted voltage level and increase a clock signal to a boosted frequency level that exceed a highest voltage level and a highest frequency level, respectively, of any independent power mode provided by the integrated circuit.

26. An integrated circuit comprising:
multiple cores, each core of the multiple cores configured to be awake if active or asleep if inactive; and
a power mode manager configured to enable activation of a software-accessible power mode collection and a hardware-reserved power mode collection, the software-accessible power mode collection including multiple independent power modes that are configured to be exposed for activation by a software-accessible power mode manager executing on the integrated circuit, the hardware-reserved power mode collection including at least one dependent power mode that is configured to be withheld from activation or exit by the software-accessible power mode manager, and
wherein a hardware-reserved power mode manager of the power mode manager is further configured to:
ascertain a number of active cores of the multiple cores;
perform a comparison including the number of active cores and an active core threshold number; and
activate, by hardware, the at least one dependent power mode to cause a boosted voltage or a boosted frequency to be provided to at least one active core of the multiple cores based on the comparison, wherein the dependent power mode includes a first voltage and frequency pair, and wherein an independent power mode includes a second voltage and frequency pair, further wherein voltage and frequency of the first voltage and frequency pair are both higher than voltage and frequency of the second voltage and frequency pair, wherein the hardware-reserved power mode manager is separate from the software-accessible power mode manager.

27. The integrated circuit of claim 26, wherein:
the multiple independent power modes of the software-accessible power mode collection are configured to be activated independently of the number of active cores;
the boosted voltage has a voltage level that is higher than voltage levels of the independent power modes that are configured to permit a number of cores to be active that exceed the active core threshold number; and
the boosted frequency has a frequency level that is higher than frequency levels of the independent power modes that are configured to permit a number of cores to be active that exceed the active core threshold number.

28. The integrated circuit of claim 26, wherein the power mode manager is configured to adjust a supply voltage and a clock signal provided to the at least one active core of the multiple cores based on the number of active cores independently of a current operational temperature and independently of a contemporaneous current draw.

29. The hardware system of claim 1, wherein the hardware-reserved power mode manager is further configured to trigger activation of the dependent power mode independent of a current workload of a processor including the cores.

30. The hardware system of claim 1, wherein the software-accessible power mode manager is configured to set an operational parameter to make the active-core-dependent power mode collection available or unavailable.

\* \* \* \* \*